United States Patent
Bacallao

(10) Patent No.: US 10,422,474 B2
(45) Date of Patent: Sep. 24, 2019

(54) SELF-LOCKING CLIP MECHANISM AND MOBILE DEVICE HOLDER INCORPORATING THE SAME

(71) Applicant: Walmart Apollo, LLC, Bentonville, AR (US)

(72) Inventor: Yurgis Mauro Bacallao, Centerton, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 104 days.

(21) Appl. No.: 15/849,848

(22) Filed: Dec. 21, 2017

(65) Prior Publication Data

US 2018/0187829 A1  Jul. 5, 2018

Related U.S. Application Data

(60) Provisional application No. 62/440,713, filed on Dec. 30, 2016, provisional application No. 62/455,126, filed on Feb. 6, 2017.

(51) Int. Cl.
*B62B 3/14* (2006.01)
*F16M 13/02* (2006.01)
(Continued)

(52) U.S. Cl.
CPC ......... *F16M 13/022* (2013.01); *B62B 3/1416* (2013.01); *B62B 3/1428* (2013.01);
(Continued)

(58) Field of Classification Search
CPC ... B62B 3/1428; B62B 3/1424; B62B 3/1472; B62B 3/1416; B62B 5/00; F16M 13/022; F16M 13/00; F16M 11/041
See application file for complete search history.

(56) References Cited

U.S. PATENT DOCUMENTS 3,069,189 A * 12/1962 Hollaender ............... E04G 7/14
285/188
4,006,874 A * 2/1977 McGee ................... F16L 3/123
248/74.3
(Continued)

FOREIGN PATENT DOCUMENTS

AU       1142402 A1    4/2002
AU    2002364902 A1    5/2004
(Continued)

OTHER PUBLICATIONS

"ChargerCity iPad iPad 2 iPad 3 Universal Tablet Handle Bar Mic Microphone Stand Shopping Cart Bicycle Wheelchair Golf Push Cart Mount (Fits all standard handle bar from .75" to 1")," ChargerCity Sporting Accessory, Amazon.com, accessed on Nov. 30, 2016.

*Primary Examiner* — Corey N Skurdal
(74) *Attorney, Agent, or Firm* — Schmeiser, Olson & Watts LLP; Timothy P. Collins

(57) ABSTRACT

A clip for coupling a portable computing device to a shopping cart comprises an inner sleeve. The inner sleeve partially encircles and applies a force to a tubular element of the shopping cart. An outer sleeve partially encircles the inner sleeve and couples the inner sleeve to the tubular element of the shopping cart. One of the inner sleeve and the outer sleeve includes a protrusion that mates with a groove in the other of the inner sleeve and the outer sleeve for locking the inner sleeve in the outer sleeve. The inner sleeve further includes a interlock slide that extends from a region of the inner sleeve not encircled by the outer sleeve for communicating with a mobile device cradle. The portable computing device is coupled to the mobile device cradle. A mobile device holder holds a mobile device for a shopper while shopping in a retail store.

20 Claims, 15 Drawing Sheets

(51) Int. Cl.
*F16M 11/04* (2006.01)
*F16M 13/00* (2006.01)
*B62B 5/00* (2006.01)

(52) U.S. Cl.
CPC .......... *F16M 11/041* (2013.01); *F16M 13/00* (2013.01); *B62B 5/00* (2013.01)

(56) References Cited

U.S. PATENT DOCUMENTS

| | | |
|---|---|---|
| 4,506,408 A | 3/1985 | Brown |
| 5,244,175 A | 9/1993 | Frankel |
| 5,263,578 A | 11/1993 | Narvey |
| 5,380,326 A | 1/1995 | Lin |
| 6,018,397 A | 1/2000 | Cloutier et al. |
| 6,158,640 A | 12/2000 | Karp et al. |
| 6,601,759 B2 | 8/2003 | Fife et al. |
| 6,606,411 B1 | 8/2003 | Loui et al. |
| 6,745,186 B1 | 6/2004 | Testa et al. |
| 6,810,149 B1 | 10/2004 | Squilla et al. |
| 6,886,101 B2 | 4/2005 | Glazer et al. |
| 6,937,989 B2 | 8/2005 | Mcintyre et al. |
| 7,177,820 B2 | 2/2007 | Mcintyre et al. |
| 7,222,363 B2 | 5/2007 | Rice et al. |
| 7,431,208 B2 | 10/2008 | Feldman et al. |
| 7,587,756 B2 | 9/2009 | Peart et al. |
| 7,716,064 B2 | 5/2010 | Mcintyre et al. |
| 8,069,092 B2 | 11/2011 | Bryant |
| 8,348,449 B2 | 1/2013 | Mccorkle et al. |
| 8,479,969 B2 | 7/2013 | Shelton, IV |
| 8,572,712 B2 | 10/2013 | Rice et al. |
| 8,814,039 B2 | 8/2014 | Bishop et al. |
| 8,820,633 B2 | 9/2014 | Bishop et al. |
| 8,851,369 B2 | 10/2014 | Bishop et al. |
| 9,059,591 B2 | 6/2015 | Niec et al. |
| 9,148,033 B2 | 9/2015 | Van Wiemeersch |
| 9,840,264 B1 * | 12/2017 | Johnson ................ B62B 3/1416 |
| 10,179,599 B1 * | 1/2019 | Lambrecht ............ B62B 3/1468 |
| 2002/0096610 A1 | 7/2002 | Ernandez |
| 2003/0198390 A1 | 10/2003 | Loui et al. |
| 2004/0069918 A1 * | 4/2004 | McKinney ............ B62B 3/1428 248/274.1 |
| 2004/0111320 A1 | 6/2004 | Schlieffers et al. |
| 2004/0139398 A1 | 7/2004 | Testa et al. |
| 2007/0204044 A1 | 8/2007 | Rice et al. |
| 2008/0215448 A1 | 9/2008 | Boyle et al. |
| 2008/0215449 A1 | 9/2008 | Boyle et al. |
| 2009/0184162 A1 | 7/2009 | Rice et al. |
| 2009/0319352 A1 | 12/2009 | Boyle et al. |
| 2009/0327087 A1 | 12/2009 | Beck et al. |
| 2012/0043931 A1 | 2/2012 | Terao et al. |
| 2012/0167182 A1 | 6/2012 | Rice et al. |
| 2013/0271070 A1 | 10/2013 | Hirano |
| 2014/0131528 A1 * | 5/2014 | Blakeley .................. H02G 3/32 248/74.2 |
| 2016/0079801 A1 | 3/2016 | Zhang et al. |
| 2016/0300235 A1 | 10/2016 | Boyle et al. |
| 2016/0355205 A1 * | 12/2016 | Upton ....................... B62B 5/00 |
| 2017/0067981 A1 * | 3/2017 | Hannah ................ G01R 35/005 |
| 2017/0349200 A1 * | 12/2017 | Winton .................... B62B 3/00 |
| 2018/0082349 A1 * | 3/2018 | Viera ...................... H04W 4/04 |
| 2018/0229746 A1 * | 8/2018 | Bacallao ................. B62B 3/02 |
| 2018/0362062 A1 * | 12/2018 | Bacallao ............... B62B 3/1472 |

FOREIGN PATENT DOCUMENTS

| | | |
|---|---|---|
| AU | 2003272329 | 6/2004 |
| CN | 205429849 U | 8/2016 |
| EP | 1182859 A2 | 2/2002 |
| EP | 1510944 A1 | 3/2005 |
| EP | 2387772 A1 | 11/2011 |
| EP | 2438562 A1 | 4/2012 |
| JP | 2000112997 | 4/2000 |
| JP | 2008282412 A | 11/2008 |
| WO | 2002029702 | 4/2002 |
| WO | 2004042614 | 5/2004 |
| WO | 2004038997 | 6/2004 |
| WO | 2005094407 | 10/2005 |
| WO | 2006012538 | 2/2006 |
| WO | 2010083113 | 7/2010 |
| WO | 2011008625 | 1/2011 |

* cited by examiner

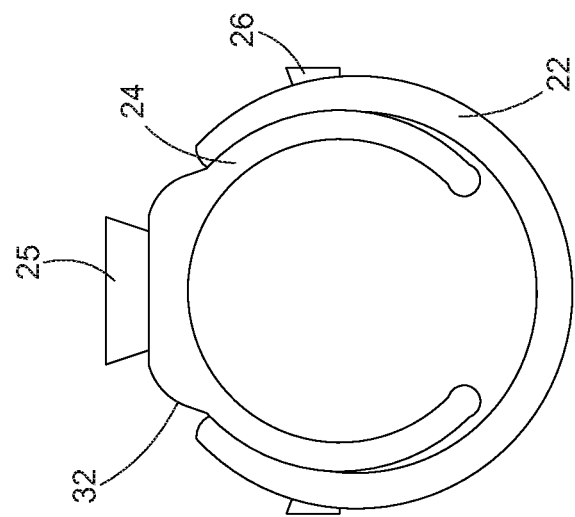
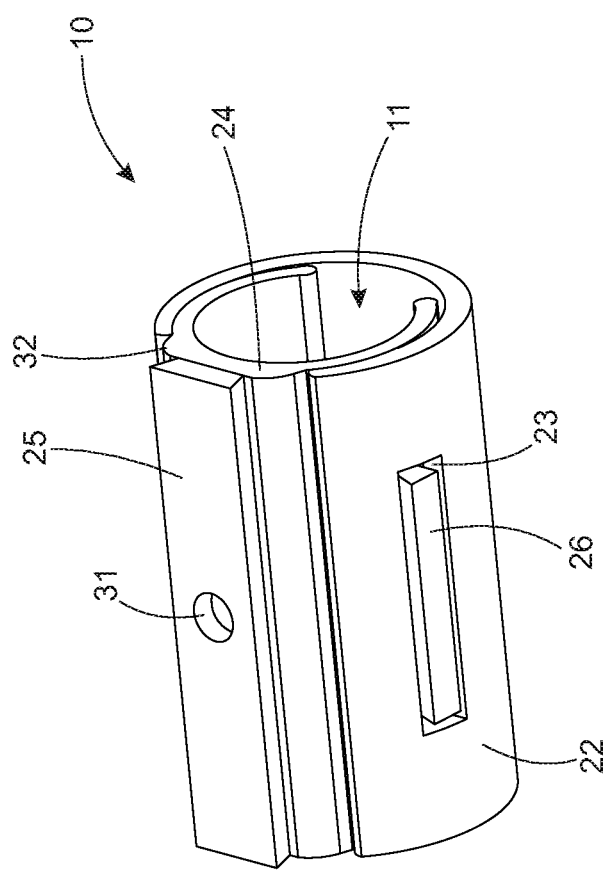

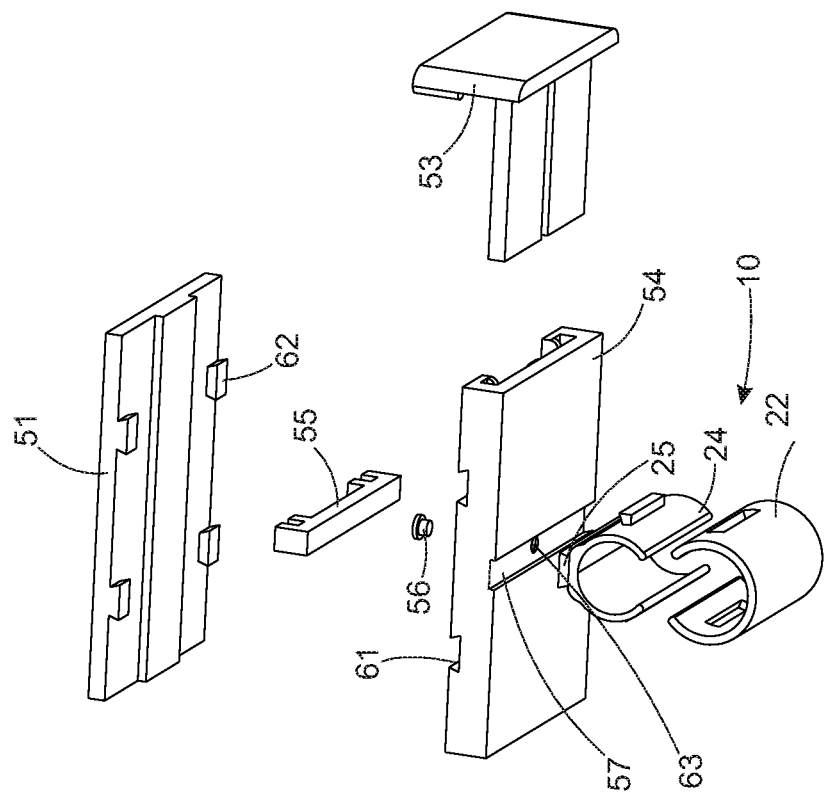
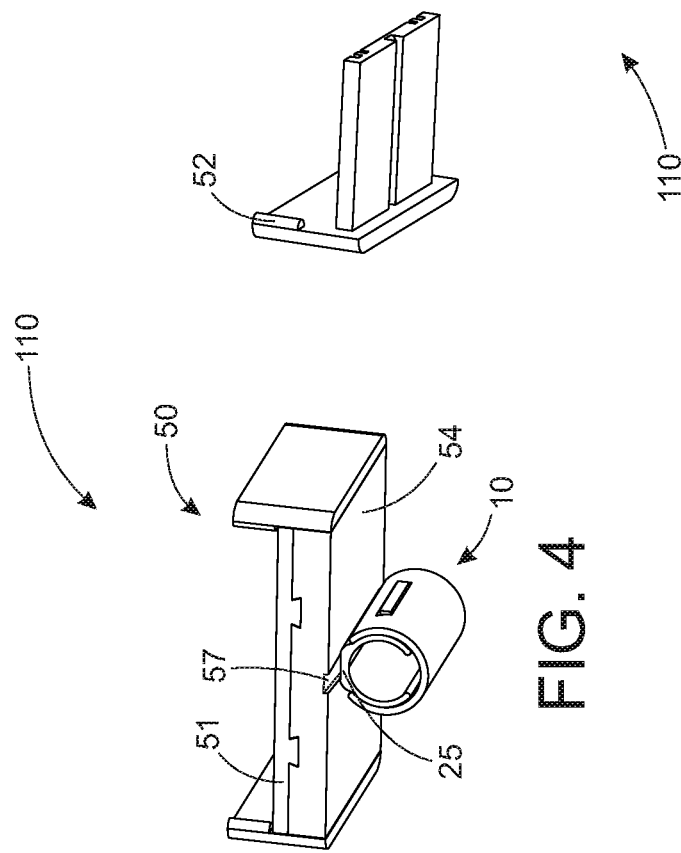

SELF-LOCKING CLIP MECHANISM AND MOBILE DEVICE HOLDER INCORPORATING THE SAME

CROSS-REFERENCE TO RELATED APPLICATIONS

This application claims the benefit and priority of U.S. Patent Application No. 62/440,713, filed on Dec. 30, 2016, and entitled SELF-LOCKING CLIP MECHANISM, and U.S. Patent Application No. 62/455,126, filed on Feb. 6, 2017, and entitled MOBILE DEVICE HOLDER, the contents of each of which are hereby incorporated by reference.

TECHNICAL FIELD

The present inventive concepts relate generally to holders for portable computing devices in a shopping environment, and more specifically, to a mobile device holding including self-locking clip mechanism for securing a portable computing device cradle to a shopping cart.

BACKGROUND

Retail establishments such as supermarkets, department stores, or other stores continue to seek solutions for improving a customer experience, for example, by implementing technology to reduce long lines at a checkout.

Portable computing devices such as smartphones, computing tablets or the like may provide useful tools for retail store customers. For example, portable computing devices can be used by customers to obtain product information, track purchases, store shopping lists, map out a shopping trip based on products needed or favorite departments, and/or pay for purchases.

It is desirable for portable computing devices configured to provide shopping-related functions to be securely coupled to a shopping cart or other carrying apparatus so that the customer can push the cart while operating the device in a hands-free manner.

SUMMARY

In one aspect, provided is a clip for coupling a portable computing device to a shopping cart, the clip comprising: an inner sleeve, wherein the inner sleeve partially encircles and applies a force to a tubular element of the shopping cart; and an outer sleeve coupled to the inner sleeve, wherein the outer sleeve partially encircles the inner sleeve and couples the inner sleeve to the tubular element of the shopping cart, wherein one of the inner sleeve and the outer sleeve includes a protrusion that mates with a groove in the other of the inner sleeve and the outer sleeve for locking the inner sleeve in the outer sleeve, the inner sleeve further including a interlock slide that extends from a region of the inner sleeve not encircled by the outer sleeve for communicating with a mobile device cradle, the portable computing device coupled to the mobile device cradle.

In some embodiments, the inner sleeve and the outer sleeve both have a C-shaped cross-section.

In some embodiments, the interlock slide couples to a groove on the device to couple the device to the clip.

In some embodiments, the inner sleeve further comprises two ridge protrusions, one on either side of the inner sleeve outer surface.

In some embodiments, the outer sleeve comprises two openings, one each through either side of the outer sleeve.

In some embodiments, the outer sleeve locks onto the inner sleeve in response to the outer sleeve partially encircling the inner sleeve and each one of the two ridge protrusions extending through a corresponding one of the two openings.

In some embodiments, the clip is locked onto the bar in response to the inner sleeve partially encircling the bar and the outer sleeve locking onto the inner sleeve.

In another aspect, provided is a self-locking mechanism for coupling a portable computing device to a shopping cart handle, comprising: a mobile device cradle for coupling with the portable computing device; an inner sleeve, wherein the inner sleeve partially encircles the bar; and an outer sleeve coupled to the inner sleeve, wherein the outer sleeve partially encircles the inner sleeve, and wherein the outer sleeve couples the inner sleeve and the clip to the bar, wherein one of the inner sleeve and the outer sleeve includes a protrusion that mates with a groove in the other of the inner sleeve and the outer sleeve for locking the inner sleeve in the outer sleeve, the outer sleeve including a interlock slide that mates with the mobile device cradle.

In some embodiments, the inner sleeve and the outer sleeve both have a C-shaped cross-section.

In some embodiments, the interlock slide couples to a groove on the device to couple the device to the clip.

In some embodiments, the inner sleeve further comprises two ridge protrusions, one on either side of the inner sleeve outer surface.

In some embodiments, the outer sleeve comprises two openings, one each through either side of the outer sleeve.

In some embodiments, the outer sleeve locks onto the inner sleeve in response to the outer sleeve partially encircling the inner sleeve and each one of the two ridge protrusions extending through a corresponding one of the two openings.

In some embodiments, the clip is locked onto the bar in response to the inner sleeve partially encircling the bar and the outer sleeve locking onto the inner sleeve.

In another aspect, provided is a method for coupling a portable computing device to a shopping cart handle, comprising: assembling a self-locking clip mechanism about the shopping cart handle, the self-locking clip mechanism comprising an inner sleeve, wherein the inner sleeve partially encircles the bar; and an outer sleeve coupled to the inner sleeve; coupling a mobile device cradle to the self-locking clip mechanism; and inserting the portable computing device in the cradle.

In another aspect, a mobile device holder for a shopping cart, the mobile device holder comprises a top plate that receives a mobile computing device; a bottom plate coupled to the top plate; a pair of sidewalls moveably coupled to the bottom plate, wherein the mobile computing device is captured between the pair of sidewalls; and a handle coupler coupled to the bottom plate. The handle coupler comprises: a first sleeve, wherein the first sleeve is coupled to the bottom plate, and wherein the first sleeve couples the bottom plate to the handle; and a second sleeve which removeably fits over the first sleeve; wherein the mobile device holder is coupled to the handle in response to the second sleeve extending over the first sleeve after the first sleeve is coupled to the handle.

In some embodiments, the first sleeve has a locking protrusion that locks to a locking slot in the second sleeve.

In some embodiments, the first sleeve has a first opening extending a length of the first sleeve, and wherein the first sleeve couples to the handle by passing the handle through the first opening, and wherein the first opening opposes a first back side of the first sleeve.

In some embodiments, the second sleeve has a second opening extending a length of the second sleeve, wherein the second opening opposes a second back side of the second sleeve, and wherein the second sleeve couples to the first sleeve by passing the first sleeve through the second opening such that the second opening is adjacent the first back side and the first opening is adjacent the second back side.

In some embodiments, the first sleeve comprise a first sleeve dovetail tongue coupled to the first back side; the bottom plate comprises a first sleeve dovetail groove in a bottom surface of the bottom plate; and the first sleeve couples to the bottom plate by coupling the first sleeve dovetail tongue to the first sleeve dovetail groove.

In some embodiments, the shopping cart mobile device holder further comprises a charging pad encased in the top plate.

In some embodiments, the top plate is communicatively coupled to the mobile computing device.

In some embodiments, the bottom plate comprises a rectangular plate of rigid material; a first slide channel coupled to a top edge of the rectangular plate; and a second slide channel coupled to a bottom edge of the rectangular plate.

In some embodiments, the shopping cart mobile device holder further comprises a pinion coupled to the bottom plate, and the first sidewall comprises a first side plate; and a first gear bar rack extending from the first side plate; wherein the first gear bar rack has a first plurality of gears, and wherein the first gear bar rack slidingly couples to the first slide channel, and wherein the first plurality of gears mechanically engage the pinion; and wherein the first gear bar rack moves the first side plate towards and away from a first side edge of the bottom plate in response to rotation of the pinion.

In some embodiments, the second sidewall comprises: a second side plate; and a second gear bar rack extending from the second side plate; wherein the second gear bar rack has a second plurality of gears, and wherein the second gear bar rack slidingly couples to the second slide channel, and wherein the second plurality of gears mechanically engage the pinion; and wherein the second gear bar rack moves the second side plate towards and away from a second side edge of the bottom plate in response to rotation of the pinion.

In some embodiments, the first sidewall comprises a first side plate; and a first coupler plate extending from the first side plate; wherein the first coupler plate couples to the bottom plate by slidingly engaging the first and the second slide channel.

In some embodiments, the top plate comprises four top plate dovetail tongues, and wherein the bottom plate comprises four bottom plate dovetail grooves, and wherein the top plate dovetail tongues couple to the bottom plate dovetail grooves.

In another aspect, a method of coupling a mobile computing device to a shopping cart comprises connecting a top plate to a bottom plate, wherein the bottom plate comprises a first and a second slide channel; slidingly coupling a first sidewall to the bottom plate; slidingly coupling a second sidewall to the bottom plate; coupling a first sleeve to the bottom plate; coupling the first sleeve to a handle of the shopping cart; coupling a second sleeve over the first sleeve to lock the first sleeve to the handle; and capturing the mobile computing device between the first and the second sidewall.

In some embodiments, the method further comprises communicatively coupling the top plate to the mobile computing device.

In some embodiments, the method further comprises coupling a mobile computing device charger to the top plate.

In some embodiments, the method further comprises coupling electrical power to the top plate.

In some embodiments, the method further comprises electrically coupling a scanner to the top plate.

In some embodiments, coupling the first sidewall to the bottom plate comprises: coupling a pinion to the bottom plate; coupling a gear bar rack to a side plate to form the first sidewall; and extending the gear bar rack into the first slide channel such that the gear bar rack engages the pinion, and such that the side plate moves towards and away from the bottom plate in response to rotation of the pinion.

In some embodiments, the method further comprises coupling a coupler plate to a side plate to form the first sidewall.

In some embodiments, slidingly coupling the first sidewall to the bottom plate comprises slidingly coupling the coupler plate into the first and the second slide channel.

BRIEF DESCRIPTION OF THE DRAWINGS

Advantages of examples of the present inventive concepts may be better understood by referring to the following description in conjunction with the accompanying drawings, in which like numerals indicate like structural elements and features in various figures. The drawings are not necessarily to scale, emphasis instead being placed upon illustrating the principles of features and implementations.

FIG. 1 is a perspective view of a self-locking clip mechanism, in accordance with some embodiments.

FIG. 2 is a side view of the self-locking clip mechanism of FIG. 1

FIG. 4 is a perspective view of a mobile device holder comprising the self-locking clip mechanism of FIGS. 1-3 coupled to a mobile device cradle, in accordance with some embodiments.

FIG. 5 is an exploded view of the mobile device holder of FIG. 4.

DETAILED DESCRIPTION OF EMBODIMENTS

Figure 3:
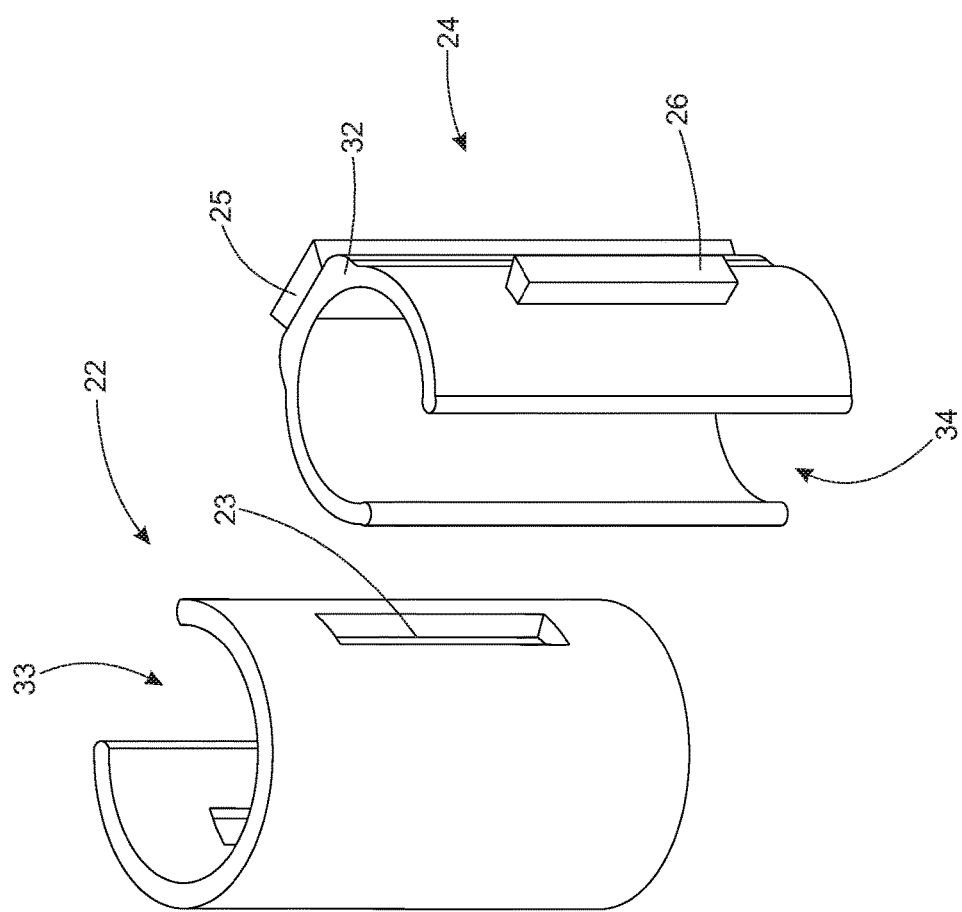
FIG. 3 is a perspective view of inner and outer clip components of the self-locking clip mechanism of FIGS. 1 and 2, separated from each other.

In some cases, customers bring their own portable computing device, e.g., a smartphone, computing tablet, or the like, into a retail store for use while shopping. In other cases, portable computing devices, or mobile devices, are distributed by the retail store for customers to use while in the store. For example, portable scanning devices are loaned to customers in some stores so that the customers can scan and electronically pay for their purchases while they shop.

As discussed herein, embodiments of the present inventive concepts relate to holders for portable computing devices, and more specifically to a self-locking clip mechanism that secures a portable computing device cradle to a shopping cart. A portable computing device such as a personal smartphone or store-provided scanning device may in turn be removably coupled to the cradle. Mobile devices can be any type of portable computing device such as, but not limited to, portable scanners, smart phones, computing tablets or pads, portable computers, global positioning system devices, portable digital assistants, or any other type of portable computing device, and can perform a number of computing functions related to a shopping application such as point of sale (POS) functions.

Along these lines, each shopper usually carries at least one mobile device. The mobile devices are often an integral part of the shopping experience, being used to find items in a store, scan items to be purchased and electronically complete the purchase. But it is difficult to both push the shopping cart and control the mobile device. In addition, it is desirable to have the mobile device be positioned close to the shopper as the shopper shops.

Described herein is a self-locking clip mechanism that includes an outer clip component, also referred to as an outer sleeve, which removably interlocks with an inner clip component, also referred to as an inner sleeve, to collectively form a circular, oval, or other relevant shaped interior that surrounds a cross-sectional region of a shopping cart handle or other tubular element and applies a force against the shopping cart element so as to not move, e.g., rotate about the shopping cart handle. One of the clip components has an interlock slide or the like that is configured to mate and lock with a cradle of a portable computing device. Thus, the cradle can be firmly attached to the shopping cart by the self-locking mechanism so that portable computing devices can be repeatably inserted into the cradle for use by a customer in a hands-free manner, for example, allowing the customer to push the shopping cart while also viewing a display on the computing device attached to the cradle on the shopping cart.

Also described herein are embodiments of the self-locking clip mechanism which in some applications may be part of a mobile device holder that holds a mobile device, and couples the mobile device to a handle of a shopping cart or shopping basket. When the mobile device holder is coupled to the shopping cart handle, it holds and positions a mobile device so it is close and convenient for us to the customer. The mobile device holder also includes a charger to charge the mobile device while it is held by the mobile device holder. The mobile device holder can be electrically coupled to both the shopping cart and the mobile device. Power can be supplied to the mobile device holder, and the mobile device, from the shopping cart or another power supply. A scanner for scanning bar codes can be coupled to the mobile device holder to provide bar code inputs to the mobile device. The mobile device holder can include a 'help' button that the customer can use to summon help from the retail store if needed. The mobile device holder provides a convenient dock for mobile devices of all types, keeps the devices charged, and provides a convenient means for holding a mobile device for use during the shopping trip.

FIG. 1 is a perspective view of a self-locking clip mechanism 10, in accordance with some embodiments. In preferred embodiments, the self-locking clip mechanism 10 is constructed and arranged to secure a mobile phone cradle to a shopping cart.

The self-locking clip mechanism 10 includes an inner clip component 24, also referred to in some embodiments as a first sleeve, and an outer clip component 22, also referred to in some embodiments as a second sleeve, that are constructed and arranged to removably interlock with each other.

Each of the clip components 22, 24 are incomplete annular cylinders, as best seen in FIGS. 1-4. An inner surface of the outer clip component 22 and an inner clip component 24 each has an arc or curve shape, e.g., a circular, oval, C-shape, semi-circle, or horseshoe shaped interior, for securing about a tubular structure, such as a handlebar or other tubular element of a shopping cart or the like (e.g., shown in FIG. 5). In particular, the inner surface has a curvature dimensioned to match an outer curvature of the handlebar or other tubular element. The coupling formed by the outer clip component 22 and an inner clip component 24, when secured about the handlebar, operates to induce a radially inward force on the inner surface of the self-locking clip mechanism 10. In some embodiments, interiors of the outer clip component 22 and an inner clip component 24 can be curved for positioning about a handlebar or other tubular structure, and the exteriors of the outer clip component 22 and an inner clip component 24 can be of a different shape, for example, linear or curved.

Each of the outer clip component 22 and an inner clip component 24 may be formed of metal, plastic, or other rigid continuous one-piece material having the strength, durability, and other characteristics sufficient for securing a portable computing device to the tubular structure via a mobile device cradle that is coupled to one of the outer clip component 22 and an inner clip component 24. For example, the outer clip component 22 and an inner clip component 24 may be formed of plastic or other material that provides rigidity and some elasticity so that the ends of the inner clip component 24 can expand to widen an opening 34 to fit around a tubular object such as a shopping cart handlebar, and for the outer clip component 22 to expand to widen an opening 33 to fit around the inner clip component 24. Inner clip opening 34 extends a length of inner clip 24. Similarly, outer clip opening 33 extends along a length of outer clip 22.

In embodiments, the inner clip component 24 includes a base protrusion 32 at an opposite side of the inner clip component 24 as the opening 34. The base protrusion 32 is constructed and arranged to have a wider or thicker region then the ends of the clip and to extend through the opening 33 in the outer clip component 22 so that the ends of the outer clip component 22, i.e., ends on either side of the outer clip opening 33, do not interfere with an interlock slide 25 or otherwise prohibit the mobile device cradle from being coupled to the interlock slide 25. In some embodiments, the interlock slide 25 has a dovetail configuration, referred to as a dovetail tongue or the like.

The outer clip component 22 and inner clip component 24 may be interlocked with each other to form a 360 degree circumference from their combined interiors positioned about the tubular handlebar or the like. In some embodiments, at least a portion of the inner clip component 24, for example, end portions, are positioned inside the outer clip component 22. During operation, the inner clip component 24 is clipped to a handlebar 118 (see FIG. 6) so that the interior region of the inner clip component 24 directly abuts and at least partially encircles the handlebar 118. Although a handlebar 118 is shown, the mobile device holder 110A can be coupled to any rod-shaped handle or rail, such as the handle of a flatbed-type cart or a rail, for example, but not by way of limitation.

The outer surface of the inner clip component 24 directly abuts an inner surface of the outer clip component 22, and may abut or otherwise apply a force to a remaining portion of the handlebar 118 not otherwise surrounded by the inner clip component 24. At least a portion of the interior of the inner clip component 24 may include a padding or foam liner or the like to provide an improved grip about the shopping cart handlebar 118.

The outer clip component 22 and inner clip component 24 may join together securely by at least one locking slot 23, or hole, window, groove or the like, in the outer clip component 22 that is constructed and arranged to mate with a locking protrusion 26 extending from a surface of the inner clip component 24. The width, diameter, circumference, shape, or other feature of the locking slot 23 can vary, depending on the width, diameter, circumference, shape, or other feature of the locking protrusion 26. In doing so, the outer clip component 22 and inner clip component 24 apply a force directly on the handlebar. Preferably, the outer clip component 22 has two locking slots 23 arranged 180 degrees from each other. Each locking slot 23 is dimensioned to receive one of two protrusions 26 extending from the inner clip component. The two protrusions 26 may also extend 180 degrees from each other to align with and be received by a corresponding locking slot 23. In some embodiments, the outer clip component 22 has the protrusions 26 that extend from the interior of the outer clip component 22 (distinguished from protrusions 26 extending from the exterior of the inner clip component 24 as described in above-mentioned embodiments) to mate with locking slots 23 in the inner clip component 24. In some embodiments, a back region of the clip 10 may include one or more support brackets, for example, a groove or the like at the back of the clip that functions as a bracket for supporting the holder and the clip together.

A top region of the inner clip component 24 includes an interlock slide 25 that is constructed and arranged to mate with a bottom of a mobile device cradle 50, for example, shown in FIGS. 4 and 5 to collectively form a mobile device holder 110. In some embodiments, the interlock slide 25 extends from the outer surface of the inner clip component 24 along a longitudinal direction of the inner clip component 24, as shown. In some embodiments, the interlock slide 25 has a taper, or more specifically, each tapered size of the projection of the interlock slide 25 tapers from an outermost surface of the slide 25 to a region where the slide 25 extends from the outer surface of the inner clip component 24. Mating surfaces of the tapered interlock slide 25 and a groove 57 of the mobile device cradle 50 are joined together to form a coupling interface. In some embodiments, the interlock slide 25 has a hole for receiving a screw or the like extending through the cradle to further hold the cradle in place against the self-locking clip mechanism 10. In some embodiments, the inner clip component 24 has a groove at its top surface and the cradle 50 has the protrusion for mating with the groove in the inner clip component 24.

Referring to FIGS. 4 and 5, the mobile device cradle 50 may include but not be limited to a top plate 51, first sidewall 52, second sidewall 53, a bottom plate 54, a cradle connector 55, and a coupling element 56.

When assembled as shown in FIG. 4, the top plate 51, first sidewall 52, second sidewall 53, a bottom plate 54, cradle connector 55, and coupling element 56 form the cradle 50 in which a portable computing device can be inserted and secured against a shopping cart handlebar 118 or related tubular structure. A bottom surface of the bottom plate 54 includes at least one groove 57 or the like for coupling with the interlock slide 25 of the self-locking clip mechanism 10. A top surface of the bottom plate 54 may include a plurality of grooves 61 or the like for coupling with protrusions 62 or the like extending from the top plate 51 to secure the top plate 51 to the bottom plate 54.

The cradle connector 55 is positioned in the middle of the cradle 50, and supports the coupling element 56 in place. The cradle connector 55 functions as a separator and locking bracket. The coupling element 56 may be a pin formed of the same material as the bracket 55. The coupling element 56 may be a pin, screw, bolt, or other attachment mechanism for securely coupling the bottom plate 54 of the cradle 50 to the self-locking clip mechanism 10. The pin 56 may hold a top section of the locking clip in place. Coupling element 56 may extend from the bottom plate 54 of the holder to a section of the locking clip, for example, hole 31 in the top section of the locking clip. For example, the coupling element 56 can be inserted in a hole 63 in the cradle bottom plate 54 that is aligned with a hole 31 in the interlock slide 25 of the self-locking mechanism 10 when the interlock slide 25 is inserted in the bottom plate groove 57. The coupling element 56 may provide a reinforcement in ensuring that the self-locking mechanism 10 is securely coupled to the mobile device cradle 50.

A feature of the self-locking clip mechanism 10 is that multiple screws or other permanent fastening components are not required to secure the clip mechanism 10 to a shopping cart handlebar 118. Referring again to FIGS. 4 and 5, the inner clip component 24 is securely coupled to the mobile device cradle 50 due to the coupling element 56. Thus, the outer clip component 22 may be separated from the inner clip component 24 by opening the outer clip component 22 to remove the outer clip opening 23 from the inner clip protrusion 26, or vice versa. Here, the cradle 50 and inner clip component 24 may be removed together from the handlebar 118.

Figure 6:
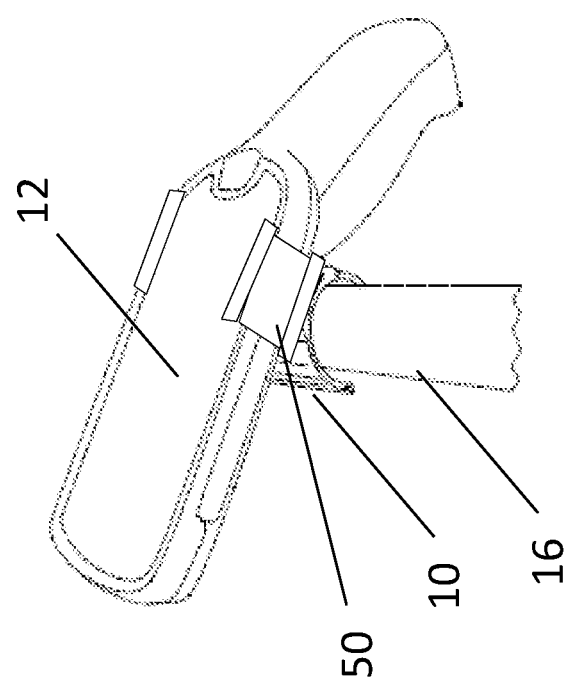
FIG. 6 is a schematic view of a self-locking clip mechanism securing a portable computing device and cradle to a shopping cart, in accordance with some embodiments.
Figure 7:
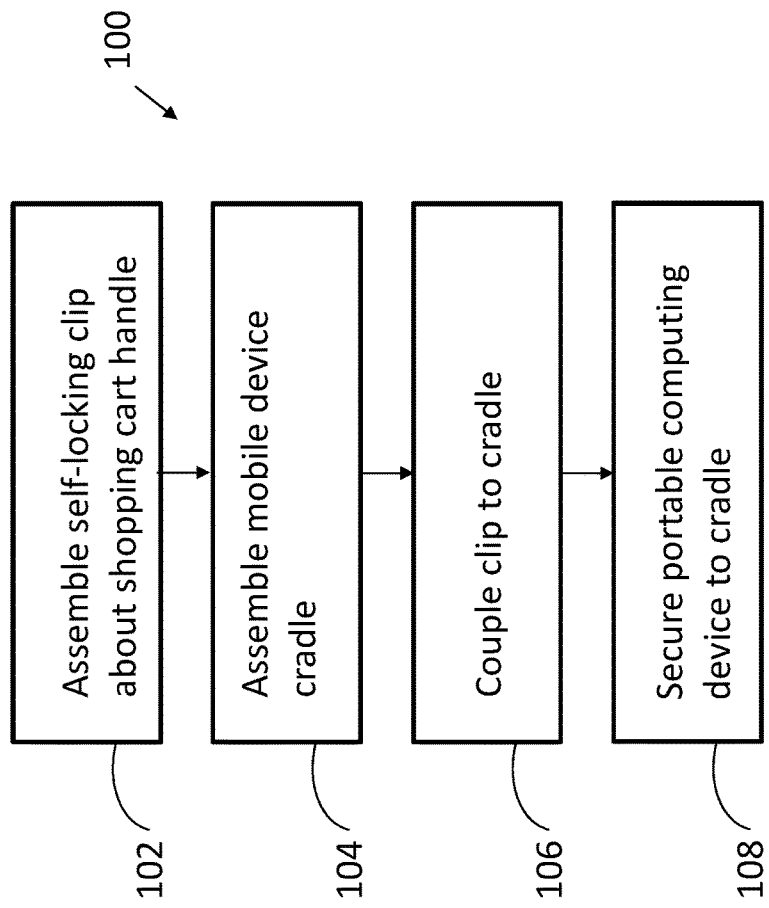
FIG. 7 is a flowchart of a method for coupling a portable computing device to a shopping cart handle, in accordance with some embodiments.

FIG. 7 is a flowchart of a method 100 for coupling a mobile computing device 114 to a shopping cart handle 118, in accordance with some embodiments. In describing the method 100, reference is made to elements of FIGS. 1-6.

At block 102, a self-locking clip mechanism 10 is assembled about a shopping cart handlebar or other tubular structure. In particular, the two halves of the self-locking clip mechanism 10, or more specifically, outer clip component 22 and inner clip component 24, are coupled to each other about the handlebar 118 or the like, for example, shown in FIG. 6. In doing so, the interlock slide 25 is positioned at a top region of the self-locking clip mechanism 10 above the handlebar 118 so that a line-of-sight is formed between the interlock slide 25 and a shopping cart user.

At block 104, the mobile device cradle 50 is assembled, for example, shown in FIGS. 4 and 5. In some embodiments, the mobile device cradle 50 is molded or machined from a single stock, and therefore, little or no assembly is required.

At block 106, the self-locking clip mechanism 10 is coupled to the cradle 50, for example, shown in FIG. 5. In doing so, the outer clip component 22 and inner clip component 24 apply a force, e.g., a radially inward force, directly on the handlebar 118.

In some embodiments, the foregoing steps 102-106 may be performed in a different order. For example, the cradle 50 may be assembled, then the inner clip protrusion 26 may be securely coupled to the cradle 50, then the inner clip component 24 can be positioned about the shopping cart handlebar 26 where the outer clip component 22 can be positioned about the inner clip component 24 to secure the clip mechanism 10 to the handlebar 118.

At block 108, a mobile computing device 114 is inserted in the cradle 50. The mobile computing device 114 may be a personal or store-provided electronic device such as a portable scanner, smartphone, computing tablet or pad, portable computer, global positioning system device, portable digital assistant, or any other type of portable device with a computer processor. Mobile device holder 110 can also hold non-computing devices such as a notepad or a voice recorder, or any other mobile device that can be held by mobile device holder 110.

Figure 8:
FIG. 8 shows a perspective view of an embodiment of an application of the self-locking clip mechanism of FIGS. 1-6, in which a mobile device holder is coupled to a handle of a shopping cart and holding a mobile computing device.
Figure 9:
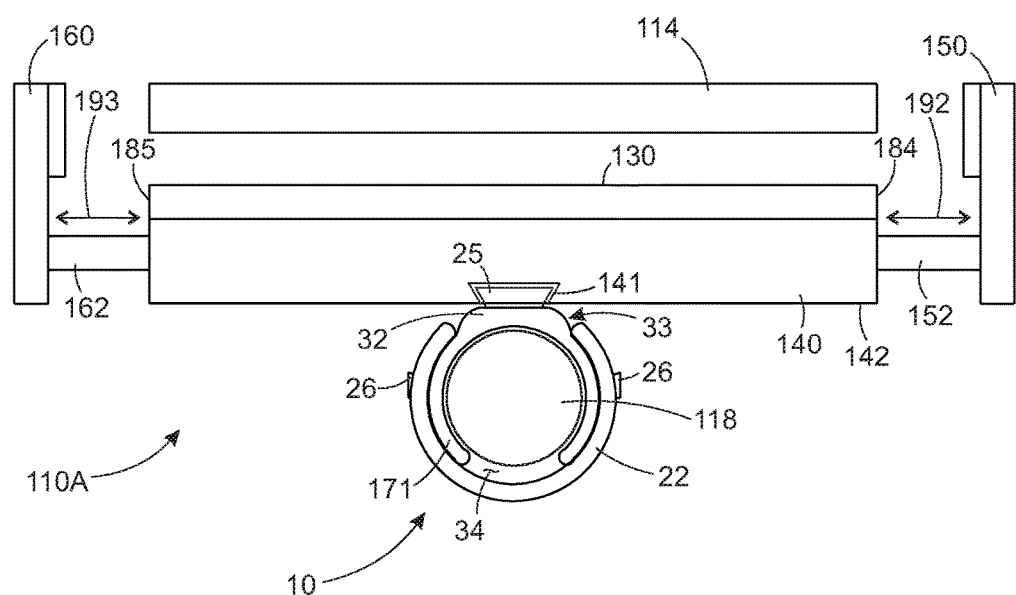
FIG. 9 shows a side view cross-section of the mobile device holder and mobile computing device of FIG. 8 coupled to the handle of the shopping cart.
Figure 10:
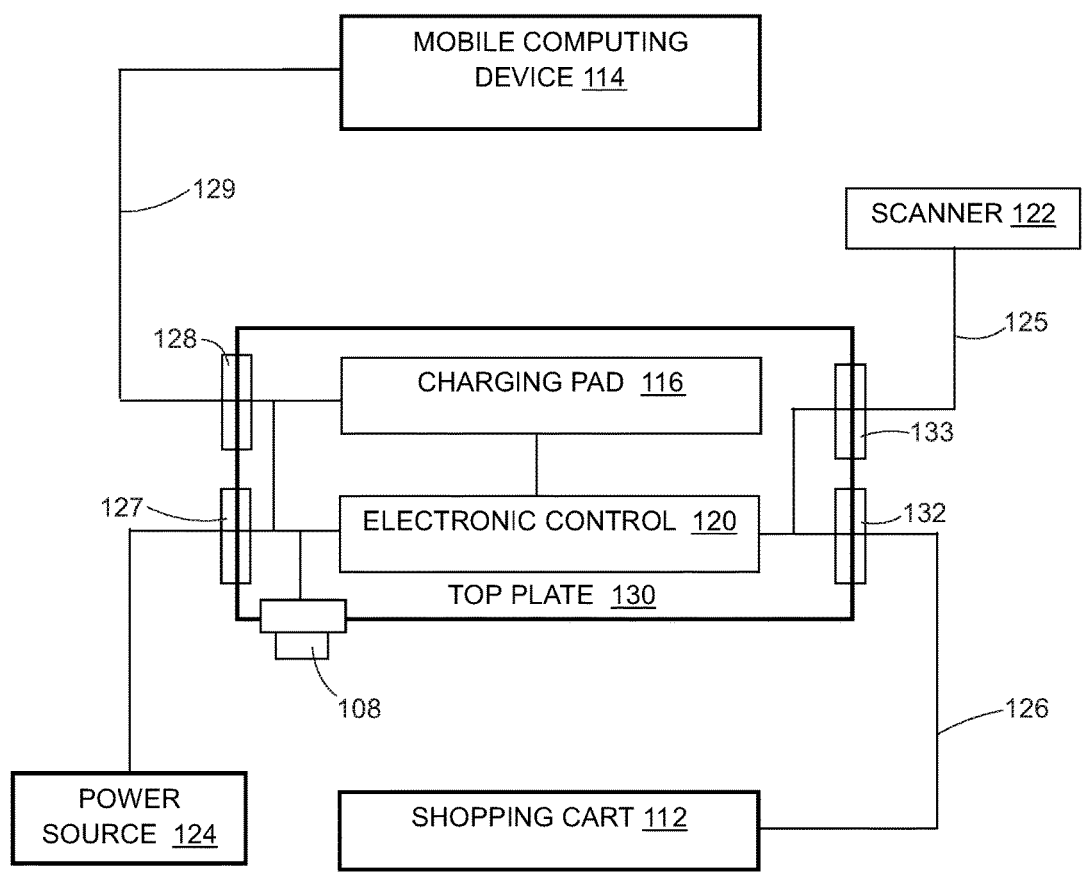
FIG. 10 shows a simplified schematic diagram of a top plate of the mobile device holder of FIG. 8, with the top plate electrically coupled to the mobile computing device, a scanner, a power source, and the shopping cart.
Figure 11:
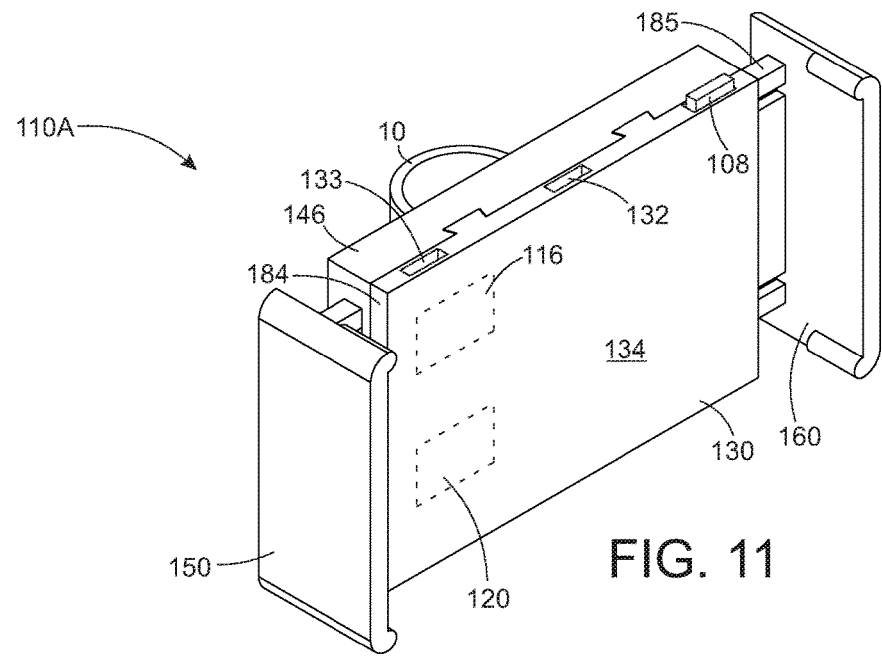
FIG. 11 shows a front perspective view of the mobile device holder of FIG. 8.
Figure 12:
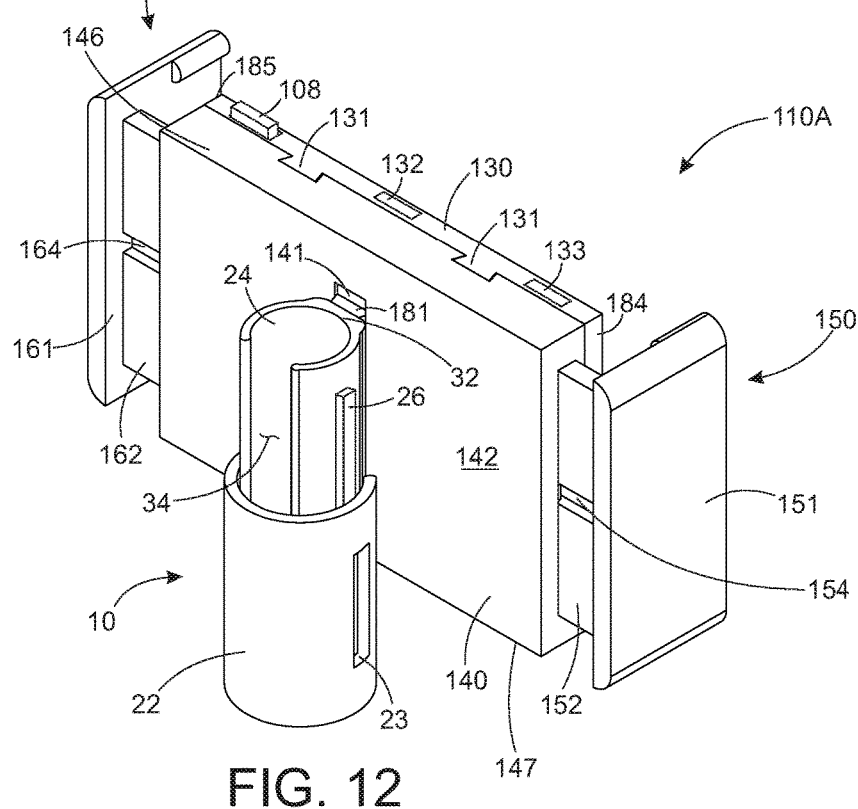
FIG. 12 shows a rear perspective view of the mobile device holder of FIG. 8.
Figure 13:
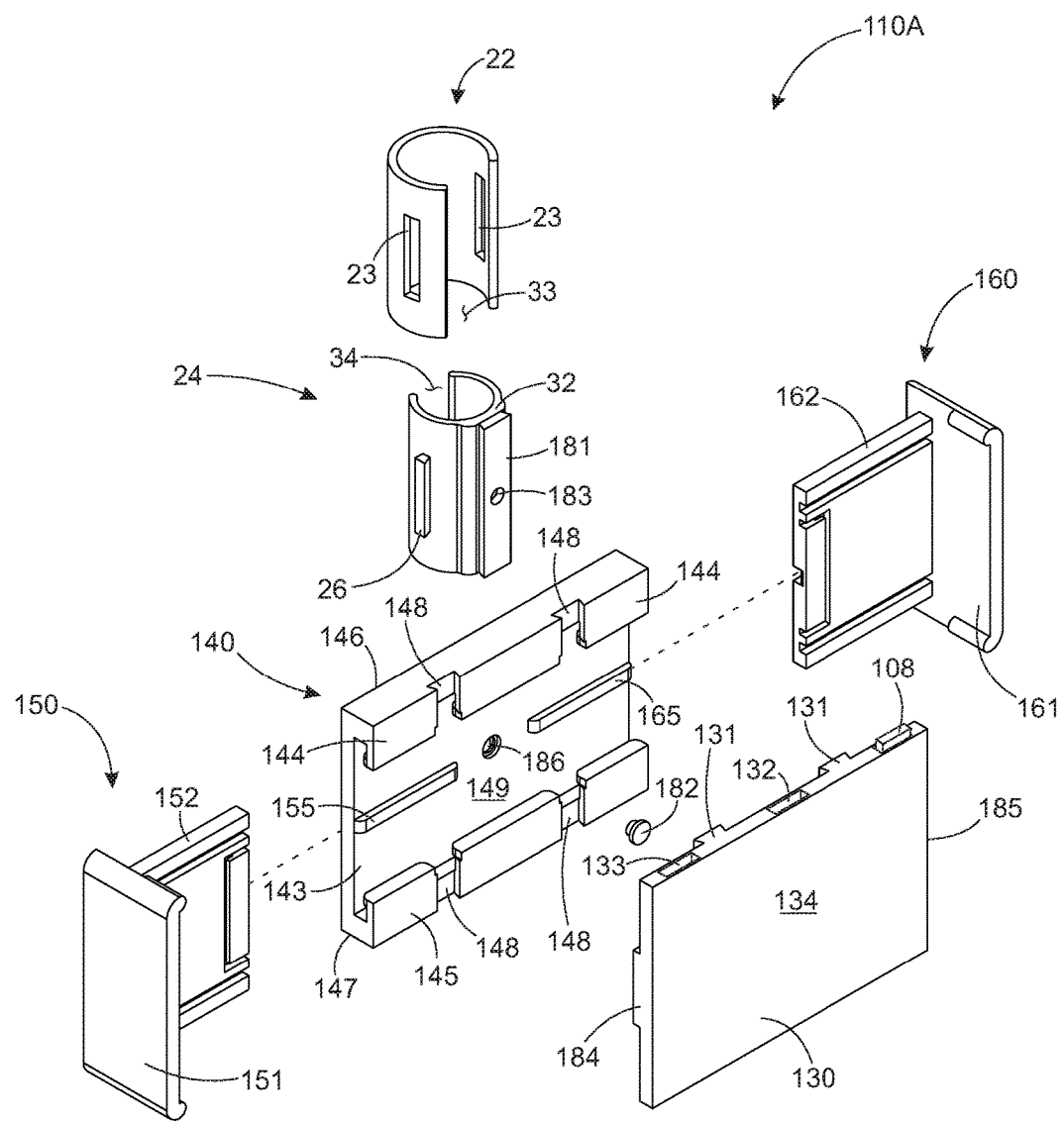
FIG. 13 shows an exploded view of the mobile device holder of FIG. 8.

FIG. 8 through FIG. 13 show another embodiment of a mobile device holder 110A. In particular, FIG. 8 shows a perspective view of mobile device holder 110A coupled to a handle 118 of a shopping cart 112, FIG. 9 shows a side cross-sectional view of mobile device holder 110A and mobile computing device 114 coupled to handle 118, FIG. 10 shows a simplified schematic diagram of a top plate 130 of mobile device holder 110A, which is electrically coupled to mobile computing device 114, a scanner 122, shopping cart 112, and a power source 124. FIG. 11 and FIG. 12 shows front and rear perspective views of mobile device holder 110A, respectively, FIG. 13 shows an exploded view of mobile device holder 110A. Elements of the mobile device holder 110A are the same as or similar to those described with respect to the mobile device holder 110 of FIGS. 4-6 and such descriptions are not repeated for brevity.

Mobile device holder 110A can be used as a holder, a docking station, a charger, or a communications interface for a mobile computing device, such as mobile computing device 114 as shown in FIG. 8. Mobile device holder 110 is, in some embodiments, communicatively coupled to mobile computing device 114. Mobile device holder 110A is, in some embodiments, communicatively coupled to shopping cart 112. Shopping cart 112 can be a smart shopping cart with communication and power capability. Mobile device holder 110A can charge mobile computing device 114, and can be an interface between mobile computing device 114 and other shopping accessories such as a scanner for capturing bar code data, for example, other input/output devices, or other electronic accessories.

In some embodiments, the mobile device holder 110A includes a top plate 130, a bottom plate 140, and a pair of sidewalls 150 and 160. Top plate 130 and bottom plate 140 are coupled together. Mobile computing device 114 sets on top plate 130 in this embodiment, as shown in FIG. 1. Top plate 130, in this embodiment, contains the electronic components of mobile device holder 110, as shown but this is not meant to be limiting. In some embodiments, bottom plate 140 contains electronic devices also. Mobile computing device 114 is captured between sidewalls 150 and 160, as shown in FIGS. 8 and 9. Sidewalls 150 and 160 slide into and out of bottom plate 140 to capture mobile computing device 114 between sidewalls 150 and 160.

Mobile device holder 110A also includes a self-locking clip mechanism 10 constructed and arranged as part of a handle coupler, which is coupled to bottom plate 140. Handle coupler 10 couples mobile device holder 110A to handle 118 of shopping cart 112, as shown in cross-sectional view in FIG. 9. The inner clip component or first sleeve 24 is coupled to handle 118 by putting handle 118 through inner clip opening 34 so that first sleeve 24 partially encircles handle 118. Outer clip component or second sleeve 22 has an opening 33. Outer clip opening 33 extends a length of second sleeve 22, shown in FIG.13. Second sleeve 22 couples to first sleeve 24 by passing first sleeve 24 through opening 33 such that second sleeve 22 partially encircles first sleeve 24. First sleeve 24 has a base protrusion 32, also referred to as a back side which opposes inner clip opening 34. Second sleeve 22 has a back side which opposes outer clip opening 33. When self-locking clip mechanism 10 is coupled to handle 118, inner clip opening 34 is adjacent outer sleeve back side, and outer clip opening 33 is adjacent inner sleeve back side 32, as seen in FIG. 9.

Second sleeve 22 locks to first sleeve 24 using a pair of locking protrusions 26 and a corresponding pair of locking slots 23. First sleeve 24 includes a pair of locking protrusions 26. Locking protrusions 26 are each a linear elongate member coupled to the outer surface of first sleeve 24, one each on either side of first sleeve 24 between opening 34 and outer sleeve back side. First sleeve 24 includes two locking protrusions 26 in this embodiment, but one or more than two locking protrusions 26 may be used.

Second sleeve 22 includes two locking slots 23 in this embodiment, but one or more than two may be used. Locking slots 23 are each an elongate slot opening through second sleeve 22, positioned and shaped to receive locking protrusions 26. When second sleeve 22 is coupled over first sleeve 24 and handle 118, each locking protrusion 26 extends through a corresponding locking slot 23 to lock second sleeve 22 to first sleeve 24, which also locks handle coupler 10 to handle 118.

First sleeve 24 couples to bottom plate 140 to couple bottom plate 140. First sleeve 24 is coupled to bottom plate 140 using a dovetail tongue 25 extending from the base protrusion 32 of the first sleeve 24. Bottom plate 140 has a dovetail groove 141 in a bottom surface 142 of bottom plate 140, as shown in FIGS. 9 and 12. First sleeve 32 of handle coupler is coupled to bottom plate 140 by sliding dovetail tongue 25 into dovetail groove 141.

Top plate 130 couples to bottom plate 140, and mobile computing device 114 sets on top plate 130. Once mobile computing device 114 is setting on top plate 130, first and second side panels 150 and 160 are moved towards mobile computing device 114 to hold mobile computing device 114 on top plate 130.

Referring to FIG. 10, top plate 130 includes a number of electronic components. FIG. 10 shows a simplified schematic of top plate 130 and some of the electronic components which are included in top plate 130 in this embodiment. Top plate 130 in this embodiment includes a charging pad 116. Charging pad 116 is a mobile computing device charger that is electrically coupled to and encased in, top plate 130, but this is not meant to be limiting. In some embodiments, charging pad 116 sets on top of top plate 130, between top plate 130 and mobile computing device 114. In some embodiments, charging pad 116 is exterior to top plate 130, and is electrically coupled to top plate 130. Charging pad 116 can be used to charge mobile computing device 114. Charging pad 116 is electrically coupled to mobile computing device 114, either wirelessly or using wires. Charging pad 116 is electrically coupled to mobile computing device 114 using electrical connection 129, which can be a wired or a wireless connection. Connection 129, in this embodiment, conducts power from charging pad 116 to mobile computing device 114, but this is not mean to be limiting. In some embodiments, connection 129 conducts communication between charging pad 116 and mobile computing device 114. Connection 129, in this embodiment, uses an electrical connector 128 to conduct power and/or communications into and out of top plate 130. Charging pad 116 keeps mobile computing device 114 charged when mobile computing device 114 is docked in mobile device holder 110A. In some embodiments, charging devices other than charging pad 116 are used with mobile device holder 110A.

Top plate 130 is communicatively coupled to mobile computing device 114 using connection 129. Top plate 130 includes an electronic control module 120 which is communicatively coupled to mobile computing device 114 using connection 129. Electronic control module 120 is a device that controls power into and out of top plate 130, and controls communications between top plate 130 and mobile computing device 114, a power source 124, shopping cart 112, which in this embodiment is a smart shopping cart 112, and a scanner 122. Electronic control module 120 also controls communication between top plate 130 and a server of the retail store. Electronic control module 120 can interface between mobile computing device 114 and a purchase utility of the retail store, if desired. In some embodiments, electronic control module 120 communicates with an in-store communication system in the retail store. Electronic control module 120 can provide many other types of communication between top plate 130, mobile device holder 110A, the retail store, mobile computing device 114, and other devices that can be used in conjunction with mobile device holder 110A or can communicate with mobile device holder 110A.

Top plate 130 obtains power, in this embodiment, from power source 124 through an electrical connector 127. Power source 124 provides electrical power to top plate 130, and, in some embodiments, to mobile computing device 114 through top plate 130. Power source 124 can be a part of or separate from shopping cart 112. In some embodiments, power source 124 obtains power when shopping cart 112 wheels are rolled along the ground. In some embodiments, power source 124 is a battery or other power supply. Power source 124 can be any type of power generator or power storage device that can supply power to top plate 130 or mobile computing device 114 or any part of mobile device holder 110A.

Shopping cart 112 communicates with top plate 130 and mobile device holder 110A using communication 126, which, in this embodiment, is conducted through an electrical connector 132. In this embodiment, the communication 126 is a wired communication, but this is not meant to be limiting. In some embodiments, the communication 126 is wireless.

Top plate 130 also includes a communication port 133. Communication port 133 is used to conduct communication 125 into and out of top plate 130. In the embodiment shown in FIG. 10, communication port 133 is used to electrically and communicatively couple top plate 130 and electronic control module 120 to a scanner 122, but this is not meant to be limiting. Communication port 133 can be used to communicatively couple many different devices to top plate 130 and electronic control module 120.

Scanner 122 is used, in this embodiment, so that a customer using mobile device holder 110 can scan product bar codes using scanner 122, to enter the products into electronic control 120 or mobile computing device 114 for purchase. Many other types of input/output devices can be communicatively coupled to top plate 130 using communication port 133, including, but not limited to, cameras, displays, pen devices, or keyboards.

Top plate 130, in this embodiment also has a help button 108, see FIG. 10 through FIG. 13. Help button 108 is used to summon assistance in the retail store. Help button 108 is a pushbutton, in this embodiment. When help button 108 is activated, a help signal is sent to a retail store server or other communication mechanism that informs the retail store that the user of mobile device holder 110A is requesting assistance. The retail store can respond by sending assistance. In some embodiments, mobile device holder 110A includes a global positioning system (GPS) device which helps the retail store find the customer in the retail store.

Bottom plate 140 can be coupled to top plate 130 in many different ways. In this embodiment, bottom plate 140 is coupled to top plate 130 using four top plate dovetail tongues 131 (only two visible in the figures) and a corresponding four bottom plate dovetail grooves 148 (FIG. 6). Each dovetail tongue 131 slides into a corresponding dovetail groove 148 to couple top plate 130 to bottom plate 140. Top plate dovetail tongues 131 couple to bottom plate dovetail grooves 148 to couple top plate 130 to bottom plate 140. It is to be understood that many other coupling means can be used to couple top plate 130 to bottom plate 140.

Pair of sidewalls 150 and 160 are slidingly coupled to bottom plate 140. Pair of sidewalls 150 and 160 are slidingly coupled to bottom plate 140 so that pair of sidewalls 150 and 160 can capture mobile computing device 114 between pair of sidewalls 150 and 160.

Bottom plate 140 is formed of a rectangular plate of rigid material 143 (FIG. 13), with a first and a second slide channel 144 and 145 coupled to plate of rigid material 143. Rectangular plate 143 has a top surface 149 and a bottom surface 142. Rectangular plate 143 has a top edge 146 and a bottom edge 147. First slide channel 144 is coupled to top edge 146 and receives first and second sidewalls 150 and 160. Second slide channel 145 is coupled to bottom edge 147 and receives first and second sidewalls 150 and 160. A slide channel, in this embodiment, is a structure that is generally U-shaped to create a channel for sidewalls 150 and 160 to slide along.

First sidewall 150 includes a first side plate 151 and a first coupler plate 152. First side plate 151, in this embodiment, is a generally rectangular shaped plate of rigid material that presses against mobile computing device 114 to hold mobile computing device 114 in mobile device holder 110A. First coupler plate 152 is a generally rectangular shaped plate of rigid material that extends from first side plate 151 to form a generally L-shaped first sidewall 150. In this embodiment, first coupler plate 152 extends from first side plate 151 in a direction perpendicular to first side plate 151. First sidewall 150 is coupled to bottom plate 140 by slidingly coupling first coupler plate 152 into both first and second slide channels 144 and 145, as shown in the figures. First and second slide channels 144 and 145 hold first coupler plate 152 between first and second slide channels 144 and 145, while allowing first coupler plate 152 to slide into and out of first and second slide channels 144 and 145 in a direction 192 towards and away from bottom plate 140. First coupler plate 152 includes a first trough 154, which receives a first coupler plate guide 155 on bottom plate 140. First coupler plate guide 155 slides into and out of first trough 154 to help first coupler plate 152 slide in direction 192 into and out of first and second slide channels 144 and 145. Once top plate 130 is coupled to bottom plate 140, first coupler plate 152 slides in first and second slide channels 144 and 145 to move first slide plate 151 in direction 192 towards and away from top plate first side edge 184. Thus, first coupler plate 152 slidingly engages first and second slide channels 144 and 145 so that first side plate 151 can move in direction 192 towards and away from top plate 130 and bottom plate 140, to capture mobile computing device 114 between first and second sidewalls 150 and 160.

Second sidewall 160 includes a second side plate 161 and a second coupler plate 162. Second side plate 161, in this embodiment, is a generally rectangular shaped plate of rigid material that presses against mobile computing device 114 to hold mobile computing device 114 in mobile device holder 110A. Second coupler plate 162 is a generally rectangular shaped plate of rigid material that extends from second side plate 161 to form a generally L-shaped second sidewall 160. In this embodiment, second coupler plate 162 extends from second side plate 161 in a direction perpendicular to second side plate 161. Second sidewall 160 is coupled to bottom plate 140 by slidingly coupling second coupler plate 162 into both first and second slide channels 144 and 145, as shown in the figures. First and second slide channels 144 and 145 hold second coupler plate 162 between first and second slide channels 144 and 145, while allowing first coupler plate 162 to slide into and out of first and second slide channels 144 and 145 in a direction 193 towards and away from bottom plate 140. Second coupler plate 162 includes a second trough 164, which receives a second coupler plate guide 165 on bottom plate 140. Second coupler plate guide 165 slides into and out of first trough 164 to help second coupler plate 162 slide into and out of first and second slide channels 144 and 145. Once top plate 130 is coupled to bottom plate 140, second coupler plate 162 slides in first and second slide channels 144 and 145 in direction 193 to move second side plate 161 towards and away from top plate second side edge 185. Thus, second coupler plate 162 slidingly engages first and second slide channels 144 and 145 to move second side plate 161 towards and away from top plate 130 and bottom plate 140 in direction 193, to capture mobile computing device 114 between first and second sidewalls 150 and 160.

Mobile device holder 110A holds mobile computing device 114, and couples to a shopping cart 112 so that mobile computing device 114, or any other mobile device, is held in a convenient position for a shopper to use both shopping cart 112 and mobile computing device 114. Mobile device holder 110A holds mobile computing device 114 in a convenient position for use, and can also charge mobile computing device 114 and communicate with mobile computing device 114, shopping cart 112, in-store communications in the retail store, and other electronic accessories.

FIGS. 14 through FIG. 18 show an embodiment of a mobile device holder 210 for a shopping cart. Mobile device holder 210 is similar to mobile device holder 110 of FIGS. 1-7 and mobile device holder 110A of FIGS. 8-13, in particular, the self-locking clip mechanism 10, and is used for the same purpose. Mobile device holder 210 is used to hold a mobile device such as mobile computing device 114 or other mobile device for a shopper while the shopper is shopping. Mobile device holder 210 is similar to mobile device holder 10 except that mobile device holder 210 uses a rack and pinion type mechanism, as explained herein, to move the first and second sidewalls in and out and capture the mobile device 114 between the sidewalls.

Figure 14:
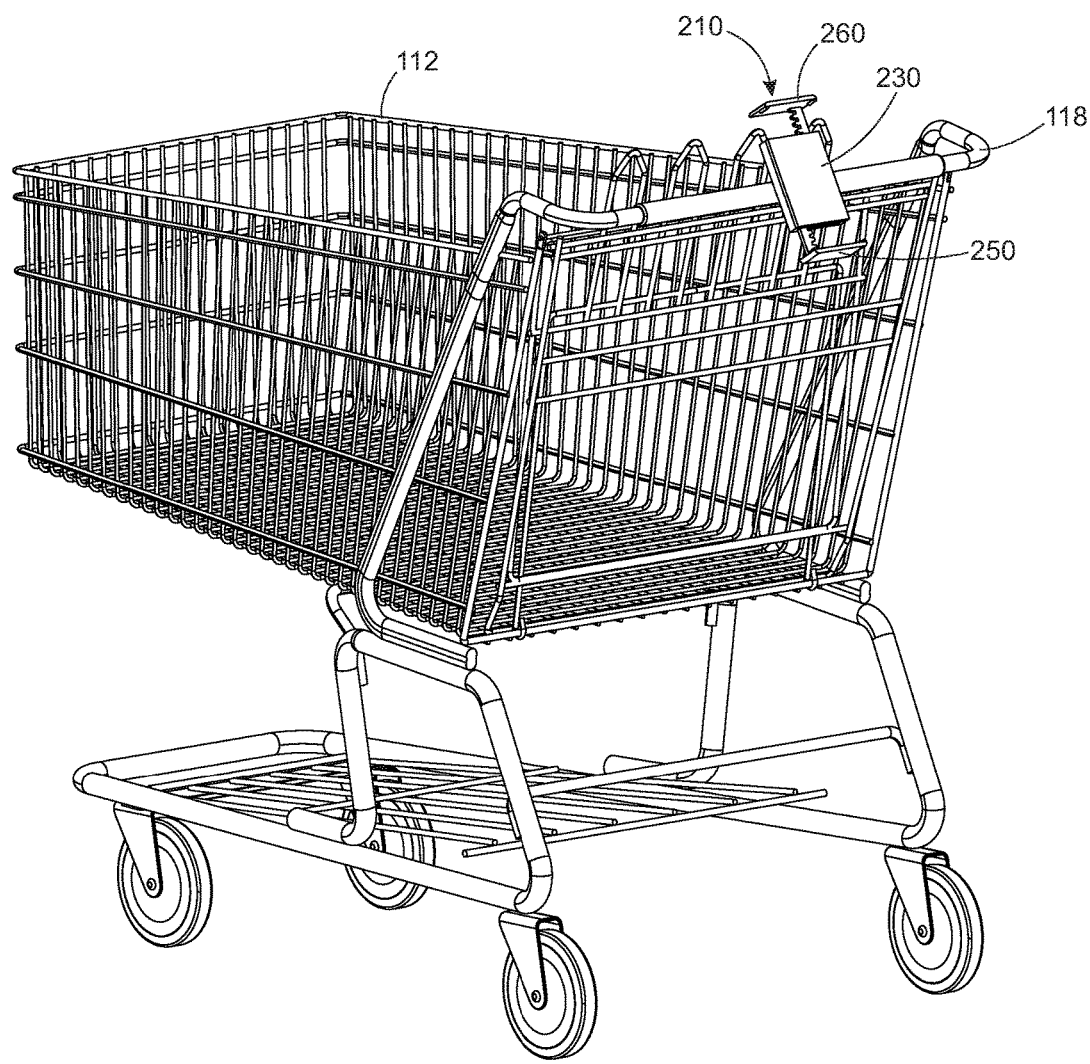
FIG. 14 shows a perspective view of a further embodiment of a mobile device holder coupled to a handle of a shopping cart.
Figure 15:
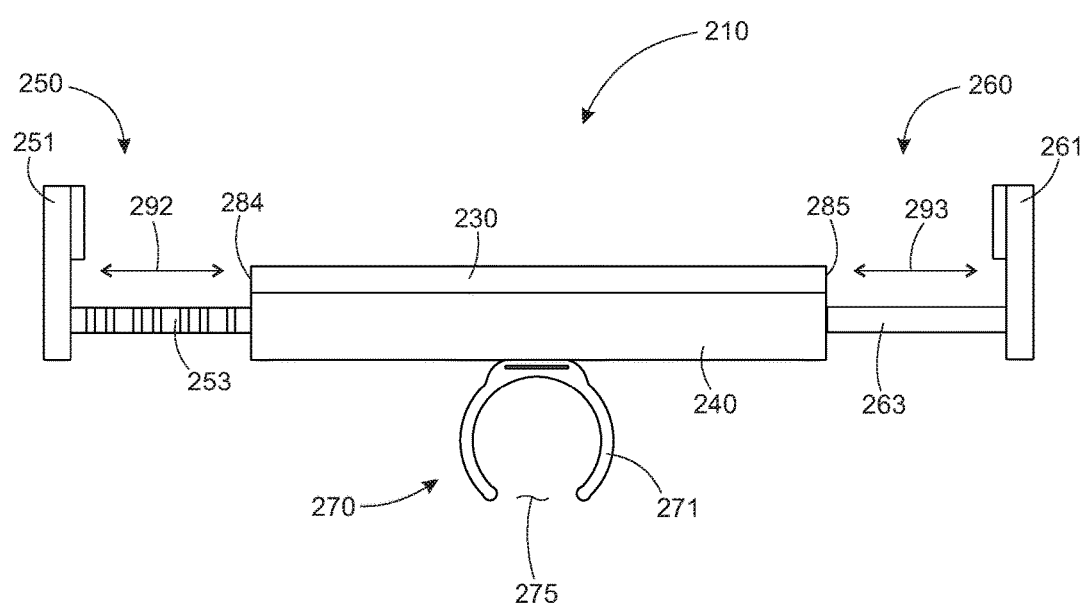
FIG. 15 shows a side view of the mobile device holder of FIG. 14.
Figure 16:
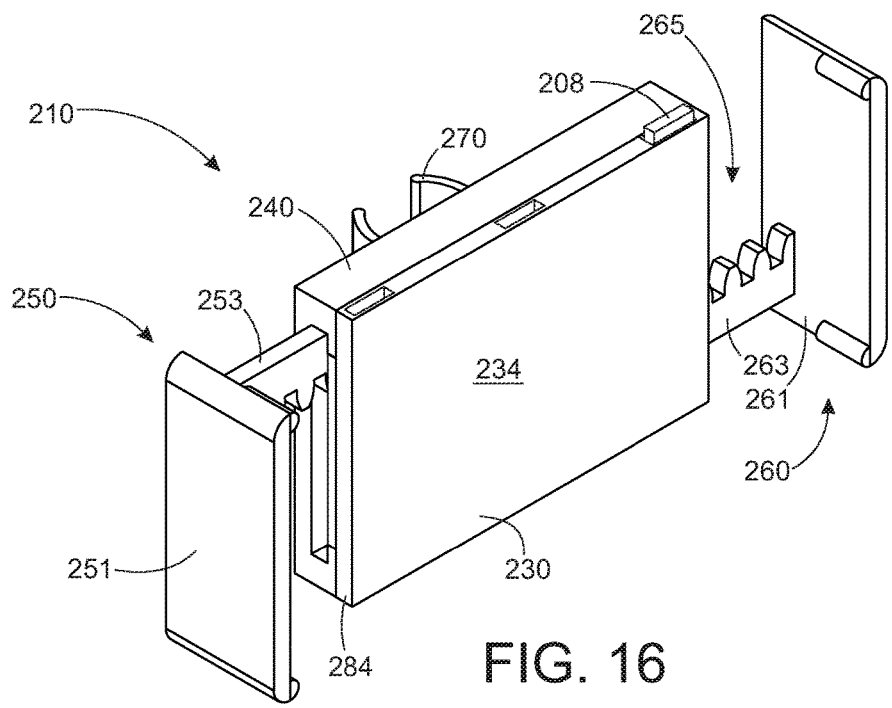
FIG. 16 shows a front perspective view of the mobile device holder of FIG. 14.
Figure 17:
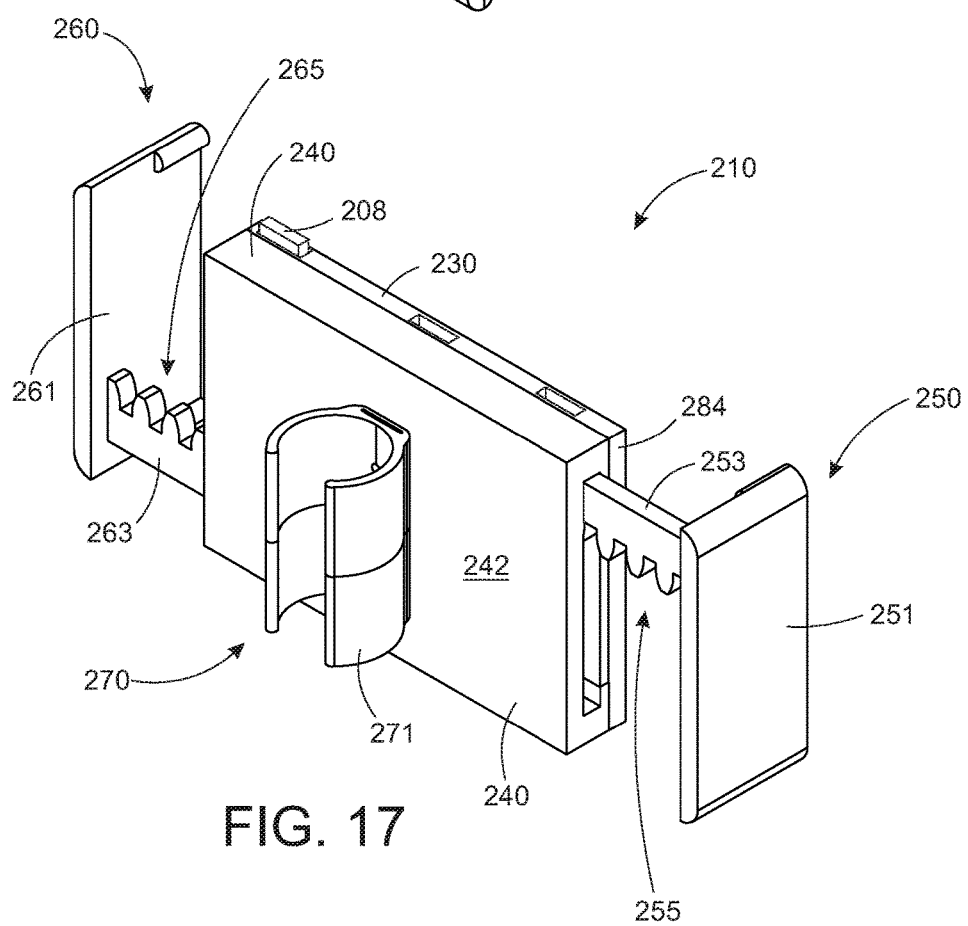
FIG. 17 shows a rear perspective view of the mobile device holder of FIG. 14.

FIG. 14 shows a perspective view of mobile device holder 210 coupled to handle 118 of shopping cart 112. Mobile device holder 210 is not holding mobile computing device 114 in FIG. 14, but mobile device holder 210 is used to hold mobile computing device 114 or another mobile device. Mobile computing device 114 is left out of FIG. 7 to show the rack and pinion details of mobile device holder 210.

Mobile device holder 210 for a shopping cart is shown in FIG. 14 coupled to handle 118 of shopping cart 112. Mobile device holder 210 can couple to any rod-shaped handle or rail, such as the handle of a flatbed-type cart or a rail extending from a shopping cart, for example, but not by way of limitation.

Mobile device holder 210 can be used as a holder, a docking station, a charger, or a communications interface for a mobile computing device 114. Mobile device holder 210 is, in some embodiments, communicatively coupled to mobile computing device 114. Mobile device holder 210 is, in some embodiments, communicatively coupled to shopping cart 112. Shopping cart 112 can be a smart shopping cart with communication and power capability. Mobile device holder 210 can charge mobile computing device 114, and can be an interface between mobile computing device 114 and other shopping accessories such as a scanner for capturing bar code data, for example, or other electronic accessories.

Mobile device holder 210 can hold many different types of mobile devices, computing and non-computing. Mobile computing device 114 can hold any type of mobile device, such as a smart phone, a tablet computing device, a scanner, a camera, a calculator, a music or video device, a mobile computer, a cellular telephone, or any other type of device with a computer processor. Mobile device holder 210 can also hold non-computing devices such as a notepad or a voice recorder, or any other mobile device that can be held by mobile device holder 210.

Referring to FIG. 15 through FIG. 18, mobile device holder 210 includes a top plate 230, a bottom plate 240, and a pair of sidewalls 250 and 260. Top plate 230 and bottom plate 240 are coupled together. Top plate 230 receives a mobile computing device 114. Top plate 230, in this embodiment, contains the electronic device and components of mobile device holder 210. The electronic components of mobile device holder 210 can be similar to the electronic components of mobile device holder 110, 110A as explained above. In some embodiments, bottom plate 240 contains electronic devices also. Sidewalls 250 and 260 slide into and out of bottom plate 240 to capture the mobile device between sidewalls 250 and 260.

Mobile device holder 210 also includes a handle coupler 270 coupled to bottom plate 240. Handle coupler 270 couples mobile device holder 210 to handle 118 of shopping cart 112. Handle coupler 270 includes a first sleeve 271 that couples to handle 118 or other round rod or bar. First sleeve 271 is an incomplete annular cylinder. An incomplete annular cylinder is an annular cylinder that is not a complete circle in cross-section. First sleeve 271 has a C-shaped cross-section.

First sleeve 271 has a first opening 275. Handle coupler 270 and first sleeve 271 are coupled to handle 118 by passing handle 118 through first opening 275 so that first sleeve 271 partially encircles handle 118.

First sleeve 271 couples to bottom plate 240 to couple handle coupler 270 to bottom plate 240. First sleeve 271 is coupled to bottom plate 240 using screws in this embodiment, but any coupling means can be used to couple first sleeve 271 to bottom plate 240. In some embodiments, mobile device holder 210 uses a handle coupler 10 instead of handle coupler 270.

Top plate 230 couples to bottom plate 240, and a mobile computing device, such as mobile computing device 114, for example, sets on top plate 230, as shown with mobile device holder 110, 110A above. Once a mobile computing device is setting on top plate 230, first and second side panels 250 and 260 hold the mobile computing device on top plate 230.

Top plate 230 or bottom plate 240 can include any of the electronics shown and described in FIG. 3 for top plate 130. In some embodiments, top plate 230 includes the same electronic components as shown in FIG. 10. In some embodiments, top plate 230 includes other electronic components. In some embodiments, bottom plate 240 includes electronic components. Mobile device holder 210 can be electrically and/or communicatively coupled to the mobile device, shopping cart 112, a scanner, or other input/output devices. Top plate 230 in this embodiment includes a charging pad to charge the mobile computing device, but this is not meant to be limiting. In some embodiments, a charging pad will set on top of top plate 230, between top plate 230 and the mobile computing device. The charging pad keeps the mobile computing device held by mobile device holder 210 charged. In some embodiments, charging devices other than a charging pad are used with mobile device holder 210.

Top plate 230 can obtain power from a power source or from a shopping cart such as shopping cart 112. Top plate 230 can include one or more connection or communication ports to communicate with mobile devices, input/output devices, or other electronic components. In some embodiments, top plate 230 communicatively couples to a scanner so that a customer using mobile device holder 210 can scan product bar codes using the scanner. Many other types of input/output devices can be communicatively coupled to top plate 230 using a communication port in top plate 230 including, but not limited to, cameras, displays, pen devices, or keyboards.

Top plate 230, in this embodiment, has a help button 208. Help button 208 is used to summon assistance in the retail store. Help button 208 is a pushbutton, in this embodiment. When help button 208 is activated, a help signal is sent to a retail store server, in-store communication, or other communication mechanism that informs the retail store that the user of mobile device holder 210 is requesting assistance. The retail store can respond by sending assistance. In some embodiments, mobile device holder 210 includes a global positioning system (GPS) device which helps the retail store find the customer in the retail store.

Bottom plate 240 is coupled to top plate 230, using screws or other coupling devices. Bottom plate 240 can be coupled to top plate 230 in many different ways. In some embodiments, bottom plate 240 is coupled to top plate 230 using dovetail grooves and dovetail tongues as shown and described for top plate 130 and bottom plate 140. It is to be understood that many different coupling means can be used to couple top plate 230 to bottom plate 240.

Mobile device holder 210 includes a pair of sidewalls that includes first sidewall 250 and second sidewall 260. Pair of sidewalls 250 and 260 are slidingly coupled to bottom plate 240. Pair of sidewalls 250 and 260 are slidingly coupled to bottom plate 240 so that pair of sidewalls 250 and 260 can capture a mobile computing device between pair of sidewalls 250 and 260.

Bottom plate 240 is formed of a rectangular plate 243 of rigid material (FIG. 11), with a first and a second slide channel 244 and 245 coupled to plate of rigid material 243. Rectangular plate 243 has a top surface 249 and a bottom surface 242. Rectangular plate 243 has a top edge 246 and a bottom edge 247. First slide channel 244 is coupled to top edge 246 and receives first sidewall 250. Second slide channel 245 is coupled to bottom edge 247 and receives second sidewall 260. A slide channel is a structure that is U-shaped to create a channel for sidewalls 250 and 260 to slide along.

First and second sidewalls 250 and 260 slidingly couple to bottom plate 240 to capture a mobile computing device between first sidewall 250 and second sidewall 260.

First sidewall 250 includes a first side plate 251 and a first gear bar rack 253 extending from first side plate 251. First side plate 251, in this embodiment, is a generally rectangular shaped plate of rigid material that presses against a mobile computing device to hold the mobile computing device in mobile device holder 210. First gear bar rack 253 is a linear elongate bar with a first plurality of gears 255 arranged along first gear bar rack 253, as shown in FIG. 10 and FIG. 11. First gear bar rack 253 extends from first side plate 251 in a direction perpendicular to first side plate 251. First gear bar rack 253 slidingly couples to first slide channel 244 such that first gear bar rack 253 moves in a direction 292 towards and away from bottom plate 240.

Figure 18:
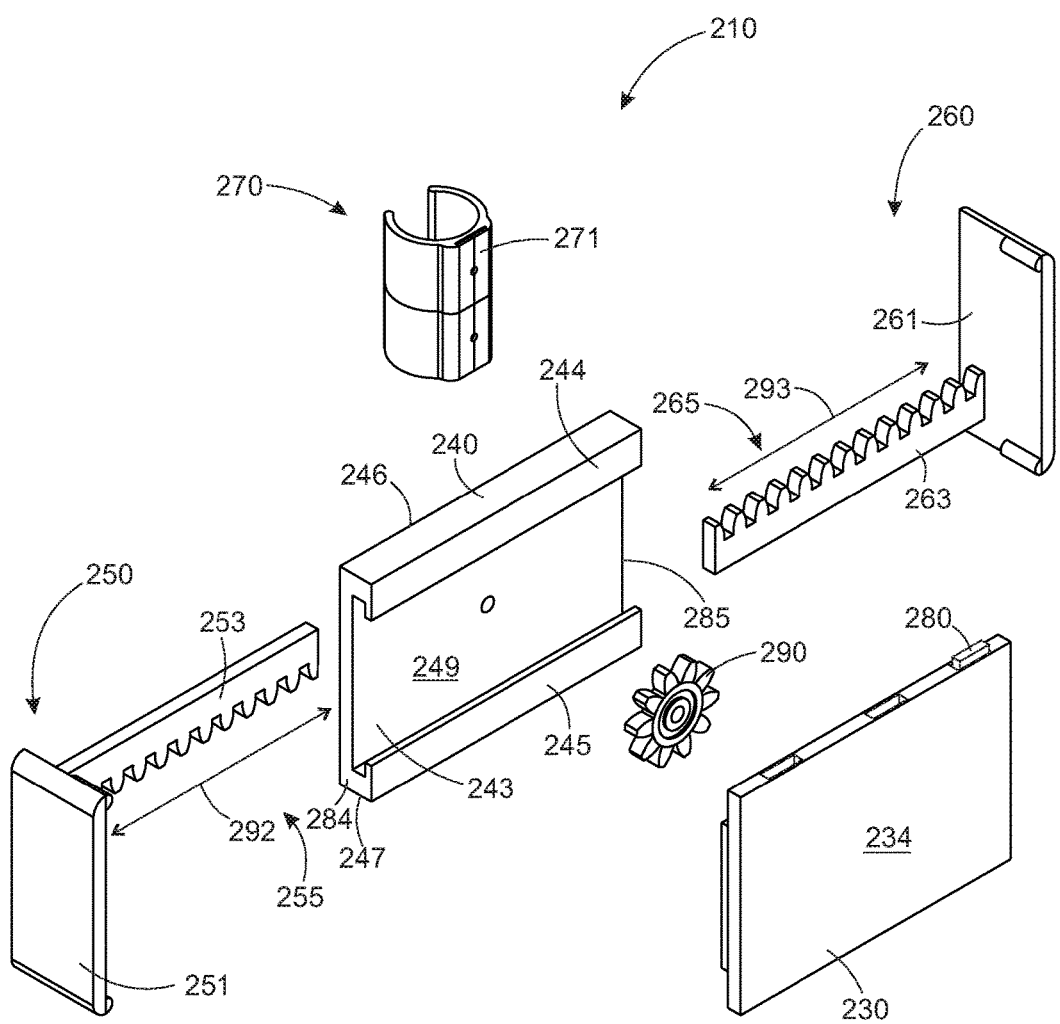
FIG. 18 shows an exploded view of the mobile device holder of FIG. 14.
Figure 19:
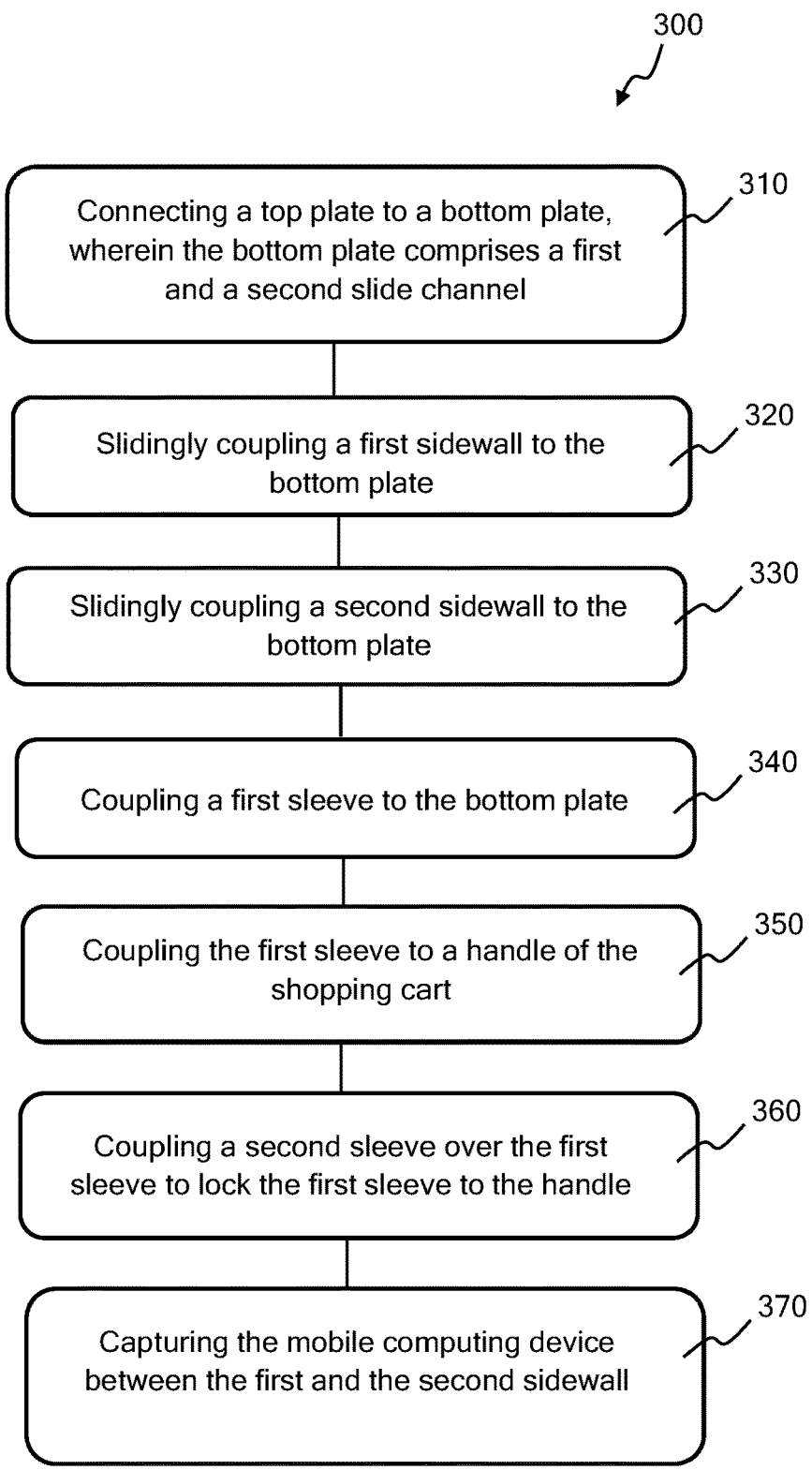
FIG. 19 illustrates a method of coupling a mobile computing device to a shopping cart.

Mobile device holder 210 includes a pinion 290 coupled to bottom plate 240, as shown in FIG. 18. Pinion 290 is coupled to bottom plate 240 such that pinion 290 rotates. A pinion is a rotary set of gears and is used, in this embodiment, to convert rotary motion to linear motion, or vice versa. In this embodiment, pinion 290 converts the rotary motion of pinion 290 into the linear motion of first and second sidewalls 250 and 260.

First gear bar rack 253 slidingly couples to first slide channel 244 such that first plurality of gears 255 engage with pinion 290. First plurality of gears 255 engaging with pinion 290 means that sliding first gear bar rack 253 into and out of first slide channel 244 causes pinion 290 to rotate. And, rotation of pinion 290 causes first gear bar rack 253 to slide into or out of first slide channel 244, depending on the direction of rotation. Rotation of pinion 290 causes first gear bar rack 253 and first side plate 251 to move in direction 292 towards or away from a first side edge 284 of bottom plate 240, depending on the direction of rotation of pinion 290.

Second sidewall 260 includes a second side plate 261 and a second gear bar rack 263 extending from second side plate 261. Second side plate 261, in this embodiment, is a generally rectangular shaped plate of rigid material that presses against a mobile computing device to hold the mobile computing device in mobile device holder 210. Second gear bar rack 263 is a linear elongate bar with a second plurality of gears 265 arranged along second gear bar rack 263. Second gear bar rack 263 extends from second side plate 261 in a direction perpendicular to second side plate 261. Second gear bar rack 263 slidingly couples to second slide channel 245 such that second gear bar rack 263 moves in a direction 293 towards and away from bottom plate 240. Second gear bar rack 263 slidingly couples to second slide channel 245 such that second plurality of gears 265 engage with pinion 290. Second plurality of gears 265 engage with pinion 290 such that sliding first gear bar rack 263 into and out of second slide channel 245 causes pinion 290 to rotate. And, rotation of pinion 290 causes second gear bar rack 263 to slide into or out of second slide channel 245, depending on the direction of rotation. Rotation of pinion 290 causes second gear bar rack 263 and second side plate 261 to move in direction 293 towards or away from a second side edge 285 of bottom plate 240, depending on the direction of rotation of pinion 290.

First and second sidewalls 250 and 260 are used to capture a mobile device that is to be held with mobile device holder 210. First and second sidewalls 250 and 260 are mechanically coupled to each other through pinion 290. Rotation of pinion 290 will cause sidewalls 250 and 260 to move towards or away from bottom plate 240. Also, moving one or the other of sidewalls 250 or 260 towards or away from bottom plate 240 will cause a corresponding motion of the other of first or second sidewall 250 or 260, through pinion 290. Moving first and second sidewalls 250 and 260 towards bottom plate 240 causes first and second sidewalls 250 and 260 to grab and hold a mobile device with mobile device holder 210. First and second sidewalls 250 and 260 capture the mobile device between first and second sidewalls 250 and 260. In this way, pinion 290, first gear rack 252, and second gear rack 263 move first and second sidewalls 250 and 260 to capture the mobile device in mobile device holder 210.

Mobile device holders 110 and 210 have been shown and described. Mobile device holders 110 and 210 couple to a shopping cart handle or other bar-shaped device so that mobile device holders 110 and 210 can hold a mobile device for a customer in a retail store. Mobile device holders 110 and 210 can do many things, including hold the mobile computing device, charge the mobile computing device, interface between the mobile computing device and input/output devices such as scanners, and cameras, and request customer assistance from the retail store. Mobile device holders 110 and 210 each include a handle coupler that couples mobile device holders 110 or 210 to a handle or other rod or bar. Mobile device holders 110 and 210 include a top plate, a bottom plate, and two sidewalls. The two sidewalls are slidingly coupled to the bottom plate such that the two sidewalls capture the mobile computing device between the two sidewalls. Mobile device holders 110 and 210 can be provided by the retail store to the customer, or can be owned by the customer and brought into the store.

FIG. 12 illustrates a method 300 of coupling a mobile computing device to a shopping cart. Method 300 of coupling a mobile computing device to a shopping cart includes block 310, where a top plate is coupled to a bottom plate, and wherein the bottom plate comprises a first and a second slide channel. The top or the bottom plate can contain electronics for communicating with the mobile computing device or the shopping cart. The top or the bottom plate can contain electronics for generating or receiving power or for charging the mobile computing device. The top or the bottom plate can contain electronics for communicating with input/output devices such as scanners, keyboards, cameras, displays, etc.

At block 320 describes a first sidewall is slidingly coupled to the bottom plate. AT block 330, a second sidewall is slidingly coupled to the bottom plate. The first and second sidewalls slide into and out of the bottom plate to capture the mobile computing device between the first and the second sidewall. In some embodiments, the first and the second sidewall slide into and out of the top plate instead of the bottom plate.

In some embodiments, block 320 of slidingly coupling the first sidewall to the bottom plate includes coupling a pinion to the bottom plate. In some embodiments, block 320 of slidingly coupling the first sidewall to the bottom plate includes coupling a gear bar rack to a side plate to form the first sidewall. In some embodiments, block 320 of slidingly coupling the first sidewall to the bottom plate includes extending the gear bar rack into the first slide channel such that the gear bar rack engages the pinion, and such that the side plate moves towards and away from the bottom plate in response to rotation of the pinion.

In some embodiments, block 320 of slidingly coupling the first sidewall to the bottom plate includes coupling a coupler plate to a side plate to form the first sidewall. In some embodiments, block 320 of slidingly coupling the first sidewall to the bottom plate includes slidingly coupling the coupler plate into the first and the second slide channel.

Method 300 of coupling a mobile computing device to a shopping cart includes block 340 where a first sleeve is coupled to the bottom plate. The first sleeve can be coupled to the bottom plate using a first sleeve dovetail tongue coupled to the first sleeve, and a first sleeve dovetail groove in the bottom plate, for example but not by way of limitation. It is to be understood that many different coupling means may be used to couple the first sleeve to the bottom plate.

At block 350, first sleeve is coupled to a handle of the shopping cart. In some embodiments, block 350 includes coupling the first sleeve to a rod or a bar other than the shopping cart handle. Block 350 can include coupling the first sleeve to any device which couples the first sleeve to the device and still allows the second sleeve to be coupled over the first sleeve. In some embodiments, the first sleeve is an incomplete annular cylinder with a first sleeve opening running the length of the first sleeve. In some embodiments, block 350 includes passing the handle through the first sleeve opening in the first sleeve such that the first sleeve partially encircles the handle.

At block 360, a second sleeve is coupled over the first sleeve to lock the first sleeve to the handle. In some embodiments, the second sleeve is an incomplete annular cylinder with a second sleeve opening extending a length of the second sleeve. In some embodiments, block 360 includes extending the combination of the first sleeve and the handle through the second sleeve opening until the second sleeve partially encircles the first sleeve and the handle. In some embodiments, block 360 includes extending the combination of the first sleeve partially encircling the handle through the second sleeve opening such that the second sleeve opening is adjacent a first back side of the first sleeve, and a first sleeve opening of the first sleeve is adjacent a second back side of the second sleeve.

Block 370 includes capturing the mobile computing device between the first and the second sidewall. The first and the second sidewall slide into and out of the bottom plate (or, in some embodiments, the top plate) so that the mobile computing device is captured between the first and the second sidewall. In some embodiments, block 370 includes setting the mobile computing device onto the top plate, and sliding the first and the second sidewalls towards the mobile computing device until the mobile computing device is captured between the first and the second sidewall.

Method 300 can include many other acts. In some embodiments, method 300 includes communicatively coupling the top plate to the mobile computing device. In some embodiments, method 300 includes communicatively coupling the bottom plate to the mobile computing device. In some embodiments, method 300 includes coupling a mobile computing device charger to the top plate. In some embodiments, method 300 includes coupling electrical power to the top plate. In some embodiments, method 300 includes electrically coupling a scanner to the top plate.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

What is claimed is:

1. A clip for coupling a portable computing device to a shopping cart, the clip comprising:
   an inner sleeve, wherein the inner sleeve partially encircles and applies a force to a tubular element of the shopping cart; and
   an outer sleeve coupled to the inner sleeve, wherein the outer sleeve partially encircles the inner sleeve and couples the inner sleeve to the tubular element of the shopping cart, wherein one of the inner sleeve and the outer sleeve includes a protrusion that mates with a groove in the other of the inner sleeve and the outer sleeve for locking the inner sleeve in the outer sleeve, the inner sleeve further including a interlock slide that extends from a region of the inner sleeve not encircled by the outer sleeve for communicating with a mobile device cradle, the portable computing device coupled to the mobile device cradle.

2. The clip of claim 1, wherein the inner sleeve and the outer sleeve both have a C-shaped cross-section.

3. The clip of claim 2, wherein the interlock slide couples to a groove on the device to couple the device to the clip.

4. The clip of claim 3, wherein the inner sleeve further comprises two ridge protrusions, one on either side of the inner sleeve outer surface.

5. The clip of claim 4, wherein the outer sleeve comprises two openings, one each through either side of the outer sleeve.

6. The clip of claim 5, wherein the outer sleeve locks onto the inner sleeve in response to the outer sleeve partially encircling the inner sleeve and each one of the two ridge protrusions extending through a corresponding one of the two openings.

7. The clip of claim 6, wherein the clip is locked onto the bar in response to the inner sleeve partially encircling the bar and the outer sleeve locking onto the inner sleeve.

8. A self-locking mechanism for coupling a portable computing device to a shopping cart handle, comprising:
   a mobile device cradle for coupling with the portable computing device;
   an inner sleeve, wherein the inner sleeve partially encircles the bar; and
   an outer sleeve coupled to the inner sleeve, wherein the outer sleeve partially encircles the inner sleeve, and wherein the outer sleeve couples the inner sleeve and the clip to the bar, wherein one of the inner sleeve and the outer sleeve includes a protrusion that mates with a groove in the other of the inner sleeve and the outer sleeve for locking the inner sleeve in the outer sleeve, the outer sleeve including a interlock slide that mates with the mobile device cradle.

9. The self-locking mechanism of claim 8, wherein the inner sleeve and the outer sleeve both have a C-shaped cross-section.

10. The self-locking mechanism of claim 8, wherein the interlock slide couples to a groove on the device to couple the device to the clip.

11. The self-locking mechanism of claim 10, wherein the inner sleeve further comprises two ridge protrusions, one on either side of the inner sleeve outer surface.

12. The self-locking mechanism of claim 11, wherein the outer sleeve comprises two openings, one each through either side of the outer sleeve.

13. The self-locking mechanism of claim 12, wherein the outer sleeve locks onto the inner sleeve in response to the outer sleeve partially encircling the inner sleeve and each one of the two ridge protrusions extending through a corresponding one of the two openings.

14. The self-locking mechanism of claim 13, wherein the clip is locked onto the bar in response to the inner sleeve partially encircling the bar and the outer sleeve locking onto the inner sleeve.

15. A mobile device holder for a shopping cart, the mobile device holder comprising:
   a top plate that receives a mobile computing device;
   a bottom plate coupled to the top plate;
   a pair of sidewalls moveably coupled to the bottom plate, wherein the mobile computing device is captured between the pair of sidewalls; and
   a handle coupler coupled to the bottom plate, wherein the handle coupler comprises:
   a first sleeve, wherein the first sleeve is coupled to the bottom plate, and wherein the first sleeve couples the bottom plate to the handle; and
   a second sleeve which removeably fits over the first sleeve;
   wherein the mobile device holder is coupled to the handle in response to the second sleeve extending over the first sleeve after the first sleeve is coupled to the handle.

16. The shopping cart mobile device holder of claim 15, further comprising a charging pad encased in the top plate.

17. The shopping cart mobile device holder of claim 15, wherein the top plate is communicatively coupled to the mobile computing device.

18. The shopping cart mobile device holder of claim 15, wherein the bottom plate comprises:
   a rectangular plate of rigid material;
   a first slide channel coupled to a top edge of the rectangular plate; and
   a second slide channel coupled to a bottom edge of the rectangular plate.

19. The shopping cart mobile device holder of claim 18, further comprising a pinion coupled to the bottom plate, and wherein the first sidewall comprises:
   a first side plate; and
   a first gear bar rack extending from the first side plate;
   wherein the first gear bar rack has a first plurality of gears, and wherein the first gear bar rack slidingly couples to the first slide channel, and wherein the first plurality of gears mechanically engage the pinion; and
   wherein the first gear bar rack moves the first side plate towards and away from a first side edge of the bottom plate in response to rotation of the pinion.

20. The shopping cart mobile device holder of claim 19, wherein the second sidewall comprises:

a second side plate; and
a second gear bar rack extending from the second side plate;
wherein the second gear bar rack has a second plurality of gears, and wherein the second gear bar rack slidingly couples to the second slide channel, and wherein the second plurality of gears mechanically engage the pinion; and
wherein the second gear bar rack moves the second side plate towards and away from a second side edge of the bottom plate in response to rotation of the pinion.

* * * * *